United States Patent
Liu et al.

(10) Patent No.: US 6,845,108 B1
(45) Date of Patent: Jan. 18, 2005

(54) TUNING OF LASER WAVELENGTH IN ACTIVELY MODE-LOCKED LASERS

(75) Inventors: Jian Liu, Mountain View, CA (US); Yue Chen, Palo Alto, CA (US); Zheng Yan, San Jose, CA (US); Wynhdam Robertson, III, Fremont, CA (US); Hong Lin, Palo Alto, CA (US)

(73) Assignee: Calmar Optcom, Inc., Sunnyvale, CA (US)

( * ) Notice: Subject to any disclaimer, the term of this patent is extended or adjusted under 35 U.S.C. 154(b) by 242 days.

(21) Appl. No.: 10/146,653

(22) Filed: May 14, 2002

Related U.S. Application Data

(60) Provisional application No. 60/318,449, filed on Sep. 10, 2001, provisional application No. 60/303,597, filed on Jul. 6, 2001, provisional application No. 60/296,330, filed on Jun. 8, 2001, and provisional application No. 60/290,804, filed on May 14, 2001.

(51) Int. Cl.[7] ............................................... H01S 3/10
(52) U.S. Cl. ..................... 372/20; 372/26; 372/29.01; 372/29.02
(58) Field of Search ......................... 372/20, 26, 29.01, 372/29.02

(56) References Cited

U.S. PATENT DOCUMENTS

| | | | |
|---|---|---|---|
| 4,025,875 A | 5/1977 | Fletcher et al. | 372/30 |
| 5,042,898 A | 8/1991 | Morey et al. | 385/37 |
| 5,229,575 A | 7/1993 | Waller et al. | 219/233 |
| 5,274,659 A | 12/1993 | Harvey et al. | 372/94 |
| 5,381,426 A | 1/1995 | Fontana et al. | 372/18 |
| 5,469,257 A | 11/1995 | Blake et al. | 356/464 |
| 5,573,860 A | 11/1996 | Hirano et al. | 428/617 |
| 5,574,739 A | 11/1996 | Carruthers et al. | 372/27 |
| 5,590,142 A | 12/1996 | Shan | 372/18 |
| 5,646,774 A | 7/1997 | Takara et al. | 359/340 |
| 5,828,680 A | 10/1998 | Kim et al. | 372/18 |
| 5,835,199 A | 11/1998 | Phillips et al. | 356/5.03 |
| 5,887,093 A | 3/1999 | Hansen et al. | 385/27 |
| 5,889,803 A | 3/1999 | Pfeiffer et al. | 372/34 |
| 5,911,015 A | 6/1999 | Bigo | 385/1 |
| 5,956,355 A | 9/1999 | Swanson et al. | 372/20 |
| H1813 H | 11/1999 | Kersey | 372/94 |
| 6,114,671 A | 9/2000 | Wehner et al. | 219/497 |
| 6,147,795 A | 11/2000 | Derbyshire et al. | 359/337 |
| H1926 H | 12/2000 | Carruthers et al. | 375/6 |
| 6,262,828 B1 | 7/2001 | Akiyama et al. | 359/237 |
| 6,266,457 B1 | 7/2001 | Jacob | 385/11 |
| 6,313,941 B1 | 11/2001 | Suzuki et al. | 359/337 |
| 6,330,383 B1 | 12/2001 | Cai et al. | 385/37 |
| 6,373,867 B1 | 4/2002 | Lin et al. | 372/18 |
| 6,389,046 B1 | 5/2002 | Stayt et al. | 372/29.02 |

FOREIGN PATENT DOCUMENTS

| | | |
|---|---|---|
| EP | 0723320 | 7/1996 |
| EP | 1030472 | 8/2000 |

OTHER PUBLICATIONS

Akimoto, Koji et al. Widely Tunable Mode–Locked Laser Diodes Using Optical Disk Filter, IEEE Photonics Technology Letters, vol. 12, No. 6, Jun. 2000, pp. 615–617.

Bakhshi et al. Pulse chirp control in an actively modelocked fibre laser using a dual–drive variable–chirp modulator, Electronics Letters, vol. 36, No. 4, pp. 325–327, Feb. 17, 2000.

Bergano et al., 640 Gb/s Transmission of Sixty–four 10 Gb/s WDM channels over 7200km with .33 (bits/s)/Hz spectral Efficiency, OFC®/IOOC '99 Tech. Digest, PD2–1—PD2–3, Feb. 23, 1999.

(List continued on next page.)

*Primary Examiner*—Minsun Oh Harvey
*Assistant Examiner*—Cornelius H. Jackson
(74) *Attorney, Agent, or Firm*—Fish & Richardson P.C.

(57) ABSTRACT

Techniques and designs for tunable and dynamically stabilized a laser wavelength in various lasers, including fiber lasers and actively mode-locked lasers. In an actively mode-locked laser, a dynamic wavelength tuning control and a dynamic cavity length control are implemented to maintain mode locking during tuning of the laser wavelength.

21 Claims, 18 Drawing Sheets-

OTHER PUBLICATIONS

Carruthers et al., 10–GHz, 1.3–ps erbium fiber laser employing soliton pulse shortening, Optice Letters, vol. 21, No. 23, pp. 1927–1929, Dec. 1, 1996.

Carruthers et al., A Dispersion–Managed, Harmonically Mode–Locked Fiber Laser, 1999.

Carruthers et al., Dispersion management in a harmonically mode–locked fiber soliton laser; Optics Letters, vol. 25, No. 3, Feb. 1, 2000.

Carruthers et al., Enhanced stability of a dispersion–managed, harmonically mode–locked fiber laser; Tuesday Morning, May 25, 1999; CLEO 1999, 11:00am.

Grigoryan et al., Dispersion–managed soliton dynamics; Optical Society of America 1997.

Horowitz et al., Dispersion management in an actively modelocked fiber laser with Kerr nonlinearity; Tuesday Morning, May 25, 1999; CLEO 1999, 11:15am.

Horowitz et al., Pulse dropout in harmonically mode–locked fiber lasers; IEEE Photonics Technology Letters, vol. 12, No. 3, Mar. 2000.

Nakazawa et al., A 40–GHz 850–fs Regeneratively FM Mode–Locked Polarization–Maintaining Erbium Fiber Ring Laser, IEEE Photonics Technology Letters, vol. 12, No. 12, pp. 1613–1615, Dec. 2000.

Nakazawa et al., Marked Increase in the Power Margin Through the Use of a Dispersion–Allocated Soliton, IEEE Photonics Technology Letters, vol. 8, No. 8, pp. 1088–1090, Dec. 1996.

Nakazawa et al., Nonlinear Pulse Transmission Through an Optical Fiber at Zero–Average Group Velocity Dispersion, IEEE Photonics Technology Letters, vol. 8, No. 3, pp. 452–454, Mar. 1996.

Smith et al., Energy–scaling characteristics of solutions in strongly dispersion–managed fibers; Optical Society of America 1996.

Smith et al., Enhanced power solitons in optical fibres with periodic dispersion management, Electronics Letters, vol. 32, No. 1, pp. 54–55, Jan. 4, 1996.

Weidman, et al., A novel negative expansion substrate material for athermalizing fiber bragg gratings, 22nd European Conference on Optical Communication, 1996, pp. 1.61–1.64, MoB 3.5.

Koji Akimoto et al., Widely Tunable Mode–Locked Laser Diodes Using Optical Disk Filter, Jun. 2000, IEEE Photonics Technology Letters, vol. 12, No. 6.

Reference Filter 220

TUNING OF LASER WAVELENGTH IN ACTIVELY MODE-LOCKED LASERS

This application claims the benefits of U.S. Provisional Application No. 60/290,804 filed on May 14, 2001, 60/296,330 filed on Jun. 8, 2001, 60/303,597 filed on Jul. 6, 2001, and 60/318,449 filed on Sep. 10, 2001. The entire disclosure of each of the above applications is incorporated herein by reference as part of this application.

BACKGROUND

This application relates to tunable lasers, and in particular, to tuning of the laser wavelength in actively mode-locked lasers.

Actively mode-locked lasers may include a laser cavity enclosing a laser gain medium to produce laser oscillation and an intra-cavity optical modulator to lock different laser modes supported by the laser cavity in phase to produce laser pulses. Such lasers may be designed to produce high-quality short optical pulses at a very high bit rate such tens of GHz or higher for various applications, including fiber communication systems.

Various applications may require the laser wavelength of a laser to be at a specific wavelength. In optical wavelength-division-multiplexed (WDM) systems, for example, the signal wavelengths of different optical WDM channels need to be at designated WDM standard wavelengths according to a wavelength standard such as the WDM wavelengths established by the International Telecommunication Union (ITU). This application provides techniques for tuning the laser wavelength of actively mode-locked fiber lasers from one desired laser wavelength to another and for dynamically locking the laser at a particular laser wavelength against drift or fluctuation in the laser wavelength.

DETAILED DESCRIPTION

The techniques and designs of this application may be used to provide a dynamically controlled wavelength tuning and locking mechanism in various lasers, such as actively mode-locked lasers and fiber lasers. This mechanism is used to control a wavelength-tuning element so that the laser wavelength is tunable to different wavelengths within a tunable spectral range, and, after the laser wavelength is tuned to a selected operating wavelength, the laser wavelength may be dynamically stabilized at the selected operating wavelength against jittering, fluctuation, or drift in wavelength. The drift in wavelength of the laser, which affects the long-term wavelength stability, may be caused by various sources, including but not limited to, aging processes in various parts of the laser cavity, and changes in the environment surrounding the laser cavity such as a change in temperature. In an actively mode-locked laser, the total optical length of the laser cavity may also be dynamically controlled to satisfy a mode-lock phase matching condition for maintaining the mode locking during the wavelength tuning.

The laser cavity of tunable and stabilized actively mode-locked lasers may be in various designs, including but not limited to, ring cavities and non-ring cavities such as linear cavities and others. Embodiments specifically disclosed in this application are fiber lasers where the laser cavity is formed of optical fibers including the laser gain medium. Such tunable actively mode-locked fiber lasers implement a tunable optical bandpass filter in the fiber cavity to select a wavelength within the spectral gain profile to lase at a desired wavelength, such as an ITU WDM wavelength. The filter may be adjusted to tune the laser wavelength from one wavelength to another within the spectral gain profile. The laser output of the fiber lasers may be tapped to produce a monitor beam to monitor the deviation in the laser wavelength from the desired wavelength. A wavelength feedback control may be coupled to control the tunable optical bandpass filter and to adjust the filter for tuning the laser wavelength and for locking the laser wavelength at the desired wavelength in response to the measured wavelength deviation. Another cavity length feedback control may be used to control the cavity length to at least compensate for the variation in the cavity length due to chromatic dispersion in the fiber cavity due to the wavelength tuning so as to maintain the mode locking.

Figure 1:
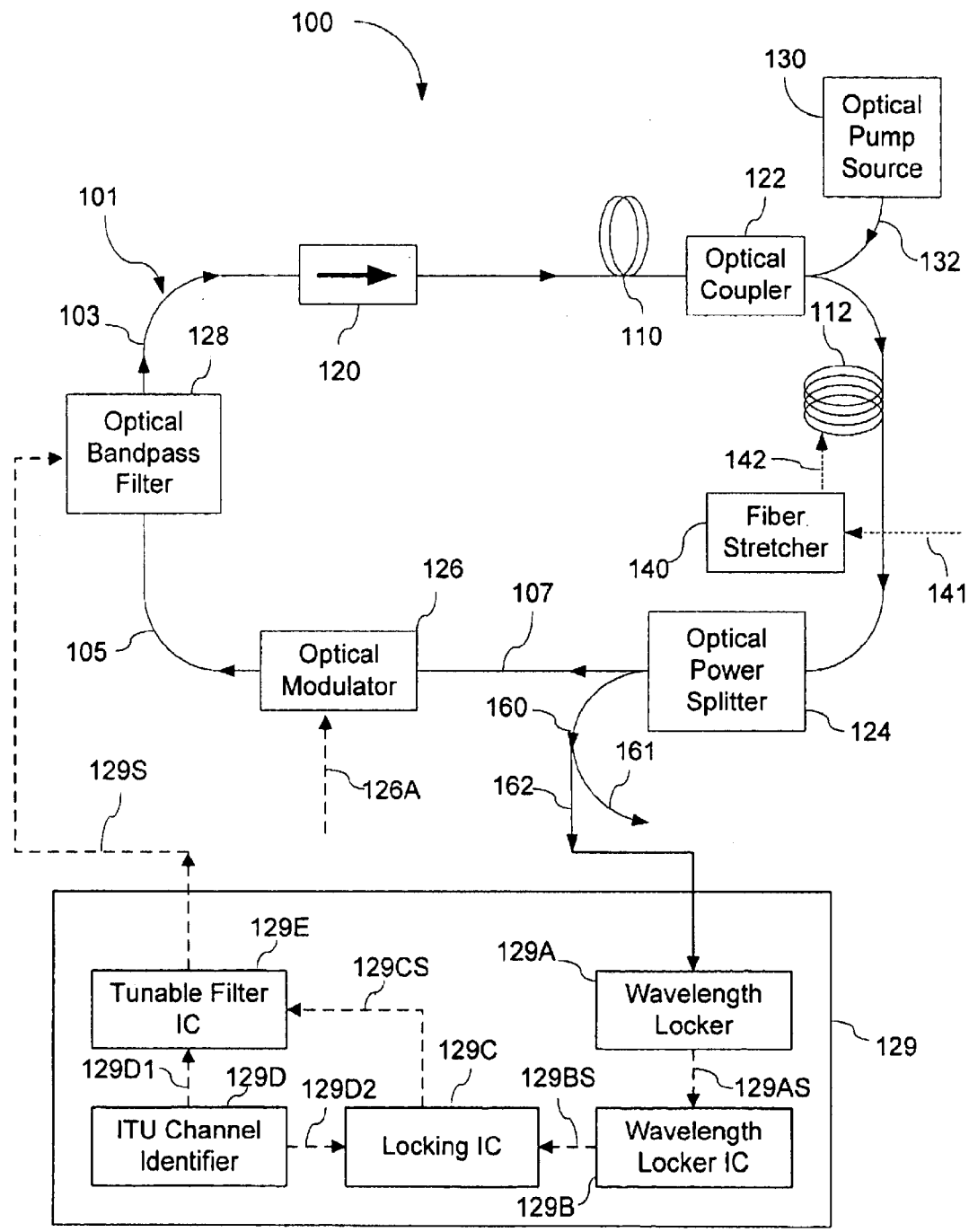
FIG. 1 shows one embodiment of an actively mode-locked fiber laser in a ring cavity design with a wavelength tuning and locking feedback control.

FIG. 1 shows one embodiment of a wavelength-tunable actively mode-locked fiber laser 100 that uses fiber segments to form a closed fiber ring or loop 101 and a wavelength control feedback mechanism. This fiber ring 101 constitutes the laser cavity. Polarization-maintaining single-mode ("PM") fibers or polarizing single-mode fibers may be used in the fiber ring 101 to maintain the optical polarization within the fiber ring 101, where a PM fiber is configured to have well-defined principal axes for two mutually orthogonal polarizations, and a polarizing fiber has a single principal polarization axis. These two types of fibers can be configured so that a principal axis is essentially not influenced by environmental conditions, such as fiber position, temperature, and stress. Therefore, the polarization of a beam propagating in such a fiber can be maintained. In the following description, the term of "polarization-maintaining fiber" will be used to include any fiber or optical waveguide that can preserve an optical polarization of a beam.

The fiber ring 101 includes a gain segment 110 which is doped with active ions to produce the desired optical gain for the laser oscillation when excited by energy from an external pump power source. The external pump power source may be electrical or optical. One example for the electrical pumping is the excitation by supplying a current to a semiconductor gain medium. In an optical pumping scheme, the pump light source produces light at a pump wavelength generally shorter than the lasing wavelength. The optical gain medium, e.g., the fiber segment 110 in this example, absorbs the pump light to produce the optical gain. When the optical gain in the segment 110 exceeds the total optical loss in the entire ring 101, laser oscillation can be generates. Different dopants may be used to achieve laser oscillations at different wavelengths. For example, atomic transitions in rare-earth ions, such as erbium, holmium, neodymium, samarium, thulium and ytterbium, can be used to produce lasers from visible wavelengths to far infrared wavelengths (e.g., from 0.45 to about 3.5 microns). Er-doped fiber lasers for producing optical pulses at 1.55 micron are particularly useful for optical fiber communication since the optical loss in the commonly used silica fibers is minimum at about 1.55 micron under optical pumping at 980 nm or 1480 nm. Two or more different rare-earth ions can be mixed together to achieve certain pump and laser wavelengths that may not be readily available from a single doping element.

An optical pump source 130 (e.g., a laser) may be used to generate the desired pump light 132 at a proper pump wavelength (e.g., 1480 nm). The pump source 130 may operate in response to an electrical driving signal such as the driving current to the diode or diodes in a diode-based pump source. An optical coupler 122 such as a fiber coupler is coupled in the fiber ring 101 adjacent to the fiber gain segment 110 to couple the pump light 132 into the gain segment 110. The optical coupler 122 is wavelength selective to couple only light at the pump wavelength and does not couple light at the laser wavelength. An optical bandpass filter 128 is deployed in the fiber ring 101 to select only the desired laser wavelength to circulate in the fiber ring 101 by suppressing light at other wavelengths. In particular, this filter 128 is a tunable filter to change the center wavelength of the transmission band and is coupled in the feedback control to tune or lock the laser wavelength.

An optical power splitter 124, e.g., a WDM fiber coupler, may be used to split a portion of the laser power at the laser wavelength in the ring 101 to produce a laser output. Another optical coupler 160 may be used to further split the laser output into a beam 161 as the final laser output and a monitor beam 162 for monitoring the condition of the laser oscillation and the fiber ring 101. An optical isolator 120 may be connected in the fiber ring 101 to ensure a single-directional oscillation in the fiber ring 101, e.g., in the clockwise direction as shown. The isolator 120 may be located between the filter 128 and the modulator 126 to reduce any back reflection from the filter 128 to the modulator 126. Alternatively, another isolator may be located between the filter 128 and the modulator 126.

A mode-locked laser generally produces multiple longitudinal modes that oscillate simultaneously. A mode-locking mechanism is implemented within the resonator to synchronize the phases of different modes in such a way that the phase difference between any two adjacent modes is a constant. These phase-locked modes constructively add to one another to produce a short pulse. In the laser 100, an intra-cavity optical modulator 126 is coupled in the fiber ring 101 to modulate the light in the fiber ring 101 under a control by a modulator control signal 126A at a modulation frequency. One exemplary implementation of such a modulator is an electro-optic modulator based on the electro-optic effect. A $LiNbO_3$ crystal or other electro-optic material may be used. A Mach-Zehnder configuration may be used in the modulator 126. The modulator 126 may be an amplitude modulator or a phase modulator.

The modulator 126 may include a driver input port for receiving the control signal 126A at the modulation frequency and a bias input port for receiving a bias control signal. A modulator driver, such as a RF signal generator or synthesizer, is used to produce the modulator control signal 126A to drive the optical modulator 126. The control signal may be a RF signal at a desired frequency, e.g. tens of GHz, such as 10 GHz, 40 GHz or higher, depending on the requirements of applications. Either the amplitude or the phase of the intra-cavity optical field may be modulated at a frequency equal to a multiplicity of the mode spacing to achieve the mode locking. To obtain stable and high-quality short pulses in the laser 100, the total laser cavity length should satisfy the above mode-locking phase matching condition and produce a mode spacing such that an integer multiple of the mode spacing matches the modulation frequency of the modulator 126 with a high accuracy, e.g., a relative deviation less than $10^{-7}$.

As illustrated, the laser 100 has a cavity length controller 140, such as a fiber stretcher coupled in the fiber ring 101, e.g., at a fiber segment 112, to control the overall optical path length of the fiber ring 101 to satisfy the phase matching condition. Another laser control mechanism may be used to adjust the length of the fiber the ring 101 to maintain this phase matching condition against drift and fluctuations in the cavity length and to reduce noise in the laser output. The fiber stretcher 140 may be controlled to provide a bias stretch in the fiber 112 to set the total cavity length near or at the desired phase-matching length and be dithered around the bias point to control the overall cavity length at a desired value to maintain the mode-locking phase-matching condition and to minimize the output noise. The bias may also be used to set the total cavity length at a desired phase-matching value so that the operating point of the fast control mechanism is set within the operating range to allow or control in both directions. At or near this bias stretch point, the fiber stretcher 140 may be operated to adjust the total length of the fiber ring 101 at a high speed to compensate for laser noise and fluctuations. This bias stretch may be tuned as a slow control mechanism to correct slow or long-term drifting of the total cavity length. As described in this application, a thermal control mechanism may also be combined with the fiber stretcher 140 to form the cavity length control mechanism.

In one implementation, a piezo-electric transducer (PZT) may be used as the fiber stretcher, where different PZT voltages of the fiber stretcher correspond to different values of the cavity length. The fiber stretcher 140 may also be coupled to control the physical length of the gain fiber 110. In another variation, both fiber segments 110 and 112 may be actively controlled by fiber stretchers.

Figure 2A:
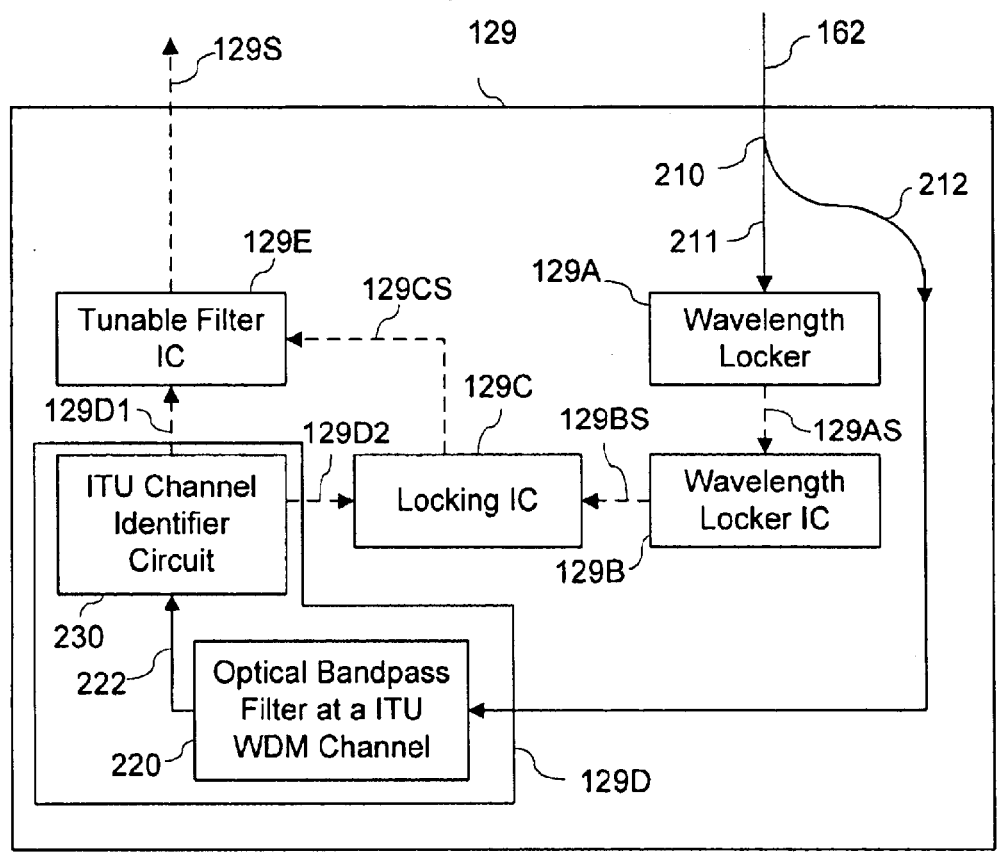
FIG. 2A shows another embodiment of the wavelength control module for the feedback control in FIG. 1.

The laser 100 implements a wavelength control module 129 coupled between the tunable optical bandpass filter 128 and the output port of the monitor beam 162 to adjust the filter 128 based on the information measured from the monitor beam 162. This forms a wavelength control feedback loop. Two embodiments of the wavelength control module 129 are shown in FIGS. 1 and 2A, respectively.

In FIG. 1, the first embodiment of the wavelength control module 129 includes a wavelength locker 129A, a wavelength locker processing circuit 129B, a locking circuit 129C, a laser wavelength identifier 129D, and a filter control circuit 129E for the tunable filter 128. The circuits may be implemented as integrated circuits (IC). The wavelength locker 129A receives the monitor beam 162 and produces an electrical signal 129AS that has information on the frequency difference between the laser wavelength and a reference frequency of the wavelength locker 129A. One implementation of the wavelength locker 129A uses a Fabry-Perot reference cavity to produce the reference frequency at a selected location within a resonance peak of the Fabry-Perot reference cavity, where the free spectral range (FSR) of the Fabry Perot cavity in the locker should be equal to the ITU WDM channel spacing to allow for locking at different ITU wavelengths. At least one optical detector may be used in the wavelength locker 129A to measure the transmitted light from the reference cavity to determine the direction and magnitude of the wavelength deviation of the laser wavelength from the reference frequency. The output of the optical detector is then used to generate the wavelength locker signal 129A. The wavelength locker processing circuit 129B is coupled to receive the signal 129AS to produce an error signal 129BS for controlling the filter 128.

The reference frequency in the wavelength locker 129A when implemented by using a Fabry-Perot cavity can be at different resonance peaks of the cavity and hence does not provide an absolute frequency measurement. The laser wavelength identifier 129D, hence, is implemented in part to provide an absolute measurement of the laser wavelength and in part to provide a tuning control mechanism to tune the filter 128 before the wavelength feedback control is tuned on to lock the laser wavelength.

The laser wavelength identifier 129D of the embodiment shown in FIG. 1 is designed to include a lookup table having values of the tuning parameter of the filter 128 and the corresponding transmission wavelengths of the filter 128. This lookup table may be established by a calibration process that measures the actual center transmission wavelengths of the filter 128 as a function of the tuning parameter such as the angle of an interference filter. The laser wavelength identifier 129D may be an ITU channel identifier that has the values of the tuning parameter of all ITU channel wavelengths. In operation, the laser wavelength identifier 129D produces a wavelength signal 129D1 to identify the absolute value of the desired operating laser wavelength. The filter control circuit 129E produces a filter control signal 129S that drives the filter 128 to transmit at the desired laser wavelength. If the laser needs to operate at another laser wavelength, the laser wavelength identifier 129D changes the value of the signal 129D1 to reset the center transmission wavelength of the filter 120.

The locking circuit 129C is designed to close the feedback loop to lock the laser wavelength after the laser wavelength identifier 129D has set the filter 128 at a desired laser wavelength. A control signal 129CS is generated based on the error signal 129BS from the locking circuit 129c and is fed into the filter control circuit 129E to adjust the filter 128 against any fluctuation or drift in the laser wavelength. Before the filter 128 is set to transmit at a desired center transmission wavelength, the locking circuit 129C does not produce the signal 129CS and thus leaves the feedback loop open. This allows the laser wavelength identifier 129D to control and adjust the filter 128 to tune the laser wavelength. In addition, when the laser wavelength is to be tuned to a different wavelength after the feedback loop is closed to lock the laser, the locking circuit 129C is commanded to open the feedback loop. To establish the above operations of the locking circuit 129C, the laser wavelength identifier 129D is designed to produce a second control signal 129D2 to control the locking circuit 129C as to whether to close or to open the feedback loop. The signal 129D2 may have two different values, one prompting the locking circuit 129C to close the feedback loop and the other prompting the locking circuit 129C to open the feedback loop.

FIG. 2A shows the second embodiment of the wavelength control module 129 where the laser wavelength identifier 129D includes at least one optical wavelength reference 220 to identify the absolute wavelength value of the laser. In this embodiment, another optical coupler 210 is implemented in the optical path of the monitor beam 162 to split the monitor beam 162 into a first monitor beam 211 for the wavelength locker 129A and a second monitor beam 212 for the optical wavelength reference 220 in the laser wavelength identifier 129D. The optical wavelength reference 220 optically processes the second monitor beam 212 to allow for identification of the absolute wavelength of the laser.

Figure 2B:
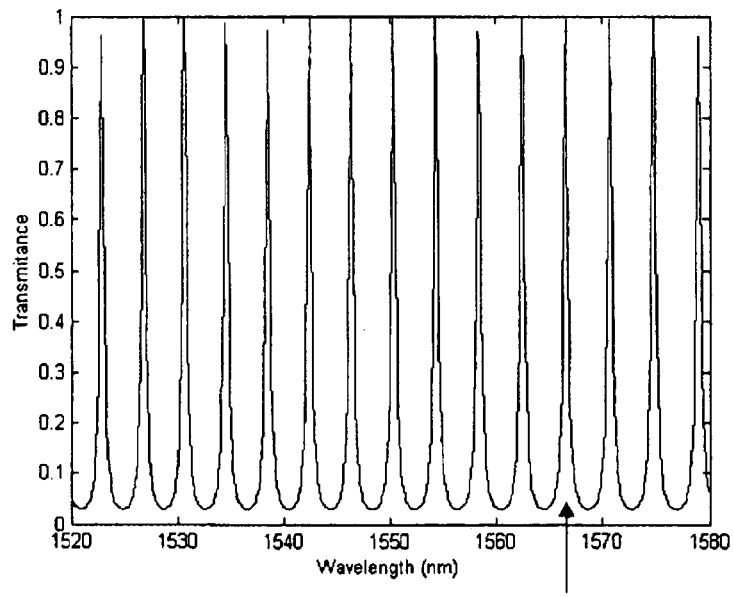
FIG. 2B illustrates operation of the wavelength control module in FIG. 2A.

In one implementation, the optical wavelength reference 220 may be a filter with a known center transmission wavelength at a WDM channel under ITU. The transmission 222 of the filter 220 may be measured by a detector in the circuit 230 to determine whether the laser is tuned to the center wavelength of the filter 230. The tunable filter control circuit 129E may be controlled by the signal 129D1 to tune the filter 128 until this is achieved. Next, the transmission of the Fabry-Perot reference cavity within the wavelength locker 129A may be monitored to count the number of transmission peaks, N, while the filter 128 is tuned. The laser wavelength to be locked is the known center wavelength of the filter 230 plus or minus the number N multiplied by the free spectral range of the Fabry-Perot reference cavity within the wavelength locker 129A depending the direction of tuning. FIG. 2B illustrates that the known center wavelength of the filter 230 is aligned at a side of a resonance peak of the Fabry-Perot reference cavity within the wavelength locker 129A. Upon completion of this tuning, the locking circuit 129C is controlled to close the feedback loop to lock the laser.

Figure 3:
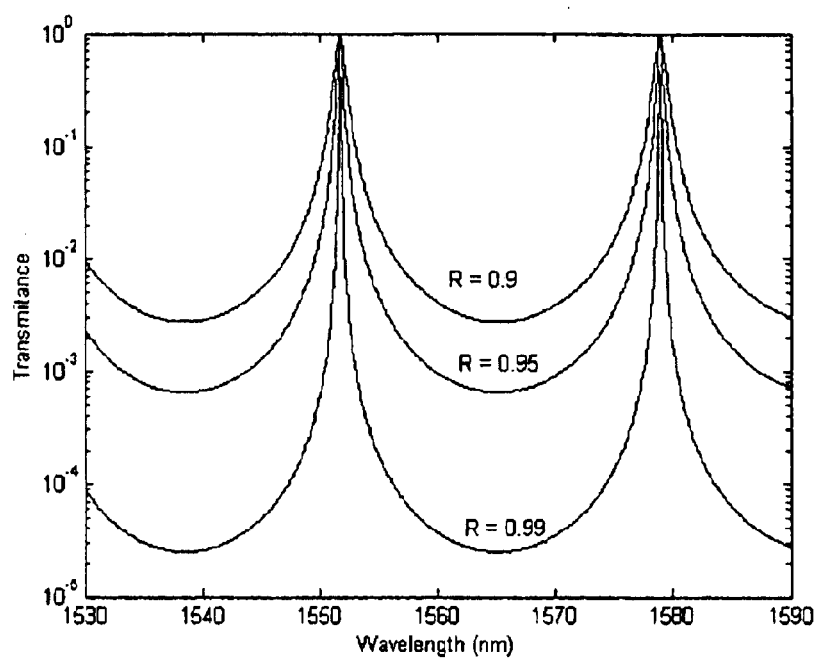
FIG. 3 shows transmission peaks of a Fabry-Perot cavity with different optical reflectance values.

The tunable optical bandpass filter 128 may be implemented as a tunable Fabry-Perot filter. Such a filter may be constructed by having two reflectors spaced from and aligned with respect to each other to form an optical resonator. The optical reflectance of the reflectors may be controlled to control the bandwidth of the spectral resonance of the filter. The free spectral range (FSR), i.e., the spectral spacing between two adjacent resonance peaks, is determined by the optical path length between the two reflectors. FIG. 3 shows the transmission spectra of a Fabry-Perot filter with a cavity spacing of 30 microns with different reflectance values for the reflectors.

The center wavelength of a resonance peak of the tunable Fabry-Perot filter may be tuned by adjusting the optical path length between the two reflectors. At least one of the refractive index of the medium between the reflectors and the spacing between the reflectors may be adjusted to achieve the tuning. Three examples are described in the following sections.

Figure 4:
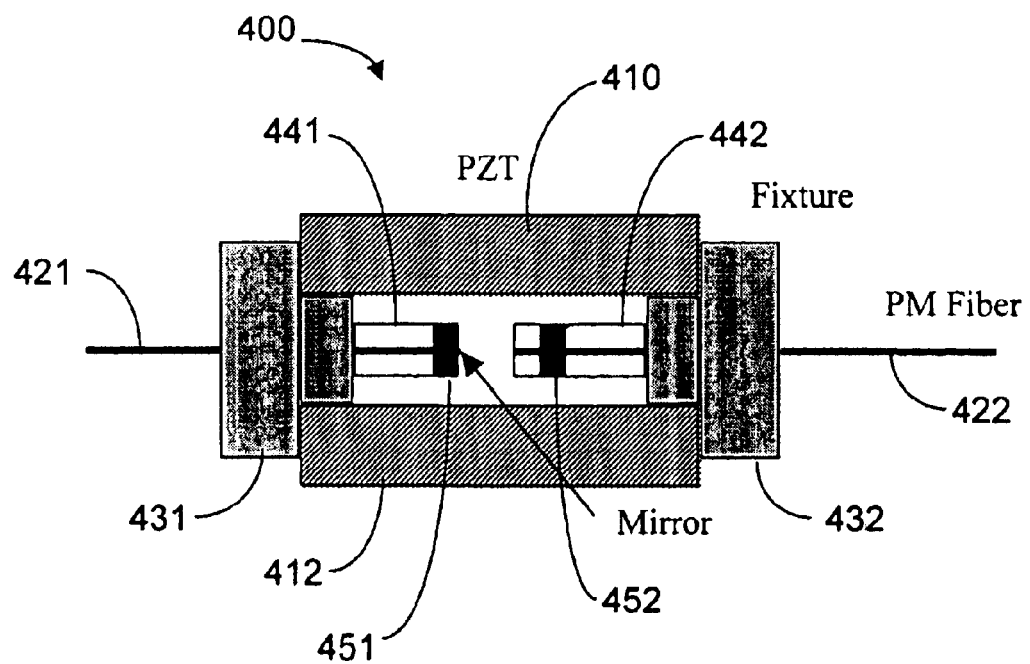
FIGS. 4, 5, and 6 show three examples of tunable Fabry-Perot filters for tuning the laser wavelength in the lasers shown in FIG. 1.

FIG. 4 shows a first example of a tunable Fabry-Perot filter 400 that may be implemented as the filter 128. The filter 400 includes a piezo tube (PZT) actuator 410 with two opposing end facets 411 and 412. An external control voltage may be applied as the control signal 129S in FIG. 1 to control the distance between the end facets 411 and 412 to tune the transmission wavelength. Two fibers 421 and 422, such as PM fibers, are respectively engaged and fixed to the two end facets 411 and 412 via fiber holders 431 and 432. Fixtures 441 and 442 are used to respectively support the terminals of the fibers 421 and 422 and to respectively hold two reflectors 451 and 452. Hence, the two reflectors 451 and 452 form the underlying Fabry-Perot cavity in which the input light can be received from one fiber and the transmitted light can be output from another fiber. As the voltage on the PZT 410 is adjusted, the length between the end facets 411 and 412 of the PZT 410 changes and so does the spacing between the reflectors 451 and 452 to tune the transmission wavelength.

Figure 5:
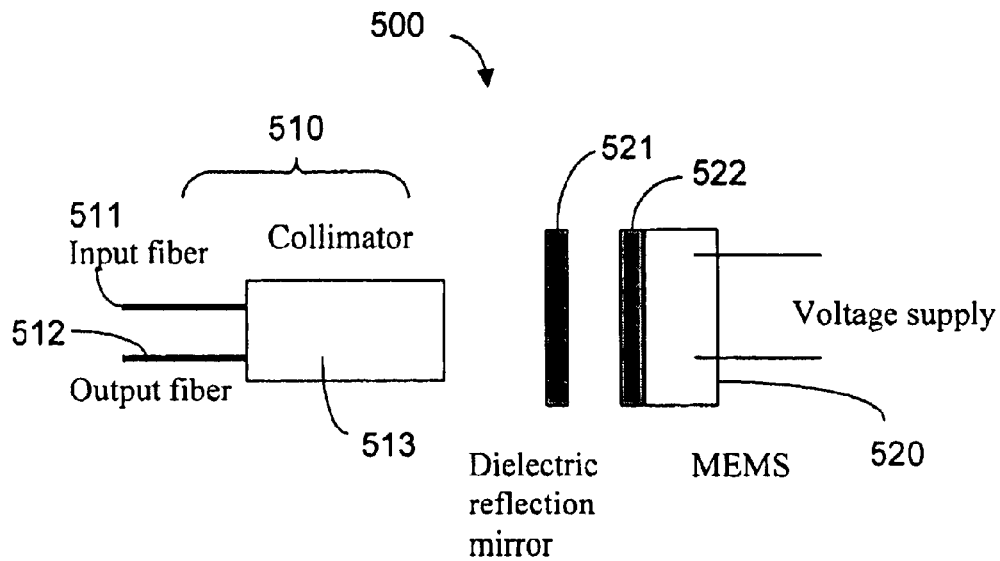

FIG. 5 shows a second example of a tunable Fabry-Perot filter 500 that may be implemented as the filter 128. Two reflectors 521 and 522, such as dielectric reflectors, may be fabricated over a substrate 520 to form a Fabry-Perot cavity and are integrated as part of a micro mechanical electrical system (MEMS) on the substrate 520. The MEMS has an actuator that can control and adjust the spacing between two reflectors 521 and 522. In one implementation, the MEMS actuator may be an electrostatic type in which the spacing between the two reflectors 521 and 522 is controlled by a control voltage. As illustrated, a dual-fiber collimator 510 is positioned on one side of the cavity to couple input light into the cavity and to receive reflected light from the cavity. The dual-fiber collimator 510 has an input fiber 511 to guide the input light and an output fiber 512 to guide the reflected light. A lens 513, such as a GRIN lens, is used to couple the input and reflected light. The fibers 511 and 512 may be parallel to each other and their end facets may be symmetrically placed in the focal plane of the lens 513 on opposite sides of the lens optic axis. This design allows the reflected light of the input light to be received by the output fiber 512.

Figure 6:
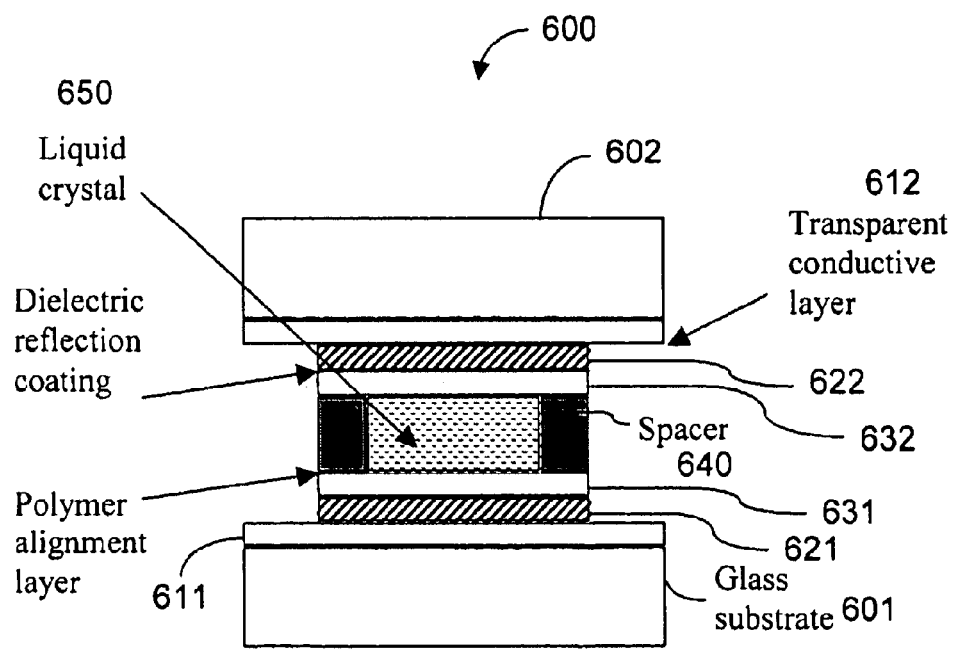

FIG. 6 shows a third example of a tunable Fabry-Perot filter 600 that may be implemented as the filter 128. Different from the filters 400 and 500, the filter 600 is tunable by changing the refractive index of the medium filled in a Fabry-Perot cavity with a fixed spacing. Hence, there is no moving part in the tunable filter 600. The index-changing medium in the cavity may be any suitable material, including an electro-optic material whose index changes with an applied electrical voltage or field and a thermal-optical material whose index changes with temperature.

The illustrated filter 600 uses a liquid crystal (LC) material 650 as the index-changing medium. Two transparent plates 601 and 602, such as glass substrates, may be used to support a LC cell that holds the LC material 650. Transparent conductive layers 611 and 612 are respectively formed on the opposing surfaces of plates 601 and 602. Two reflective coating layers 621 and 622, such as dielectric reflective coatings, are formed over the transparent conductive layers 611 and 612, respectively, to receive an external control voltage. The final LC cell is formed by having two polymer alignment layers 631 and 632 formed over the reflective coating layers 621 and 622, respectively, and a spacer 640 placed between the polymer alignment layers 631 and 632. In operation, the LC molecules are aligned by the alignment layers 631 and 632 in absence of the external control voltage. When the external control voltage is applied, the orientations of the LC molecules are changed. Accordingly, the effective refractive index of the LC material 650 is changed. The amount of the change in the refractive index is dependent on the magnitude of the applied control voltage. Hence, the applied control voltage may be used to control the optical path length between the reflectors 611 and 612 to tune the center transmission peak. The LC filter 600 may be tuned with a response time of about milliseconds.

Figure 7:
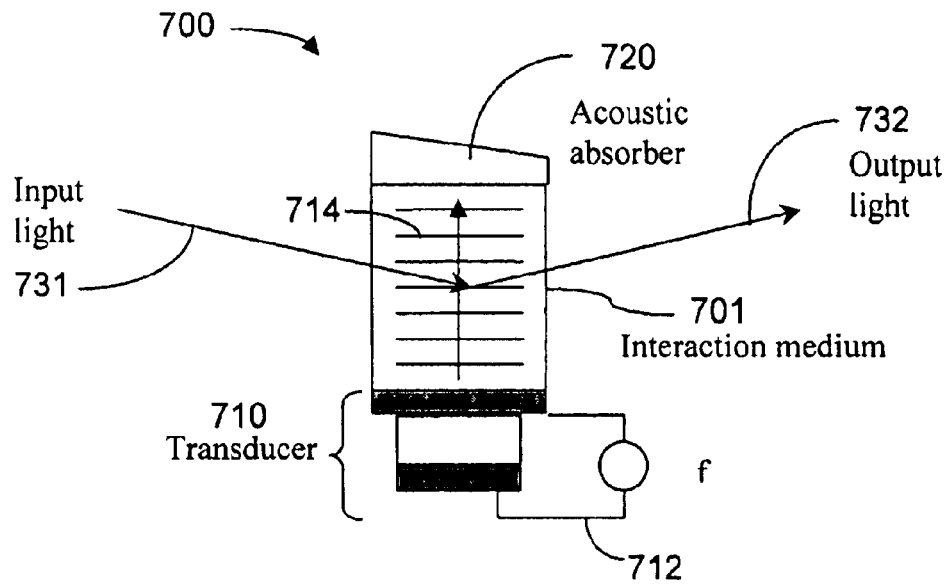
FIG. 7 shows an exemplary acousto-optic filter for tuning the laser wavelength in the lasers shown in FIG. 1.

The tunable optical bandpass filter 128 may also be implemented by a tunable acousto-optical (AO) filter 700 as shown in FIG. 7. The AO filter 700 includes an acoustic transducer 710 that produces an acoustic wave 714 in a transparent acoustic medium 701 such as a crystal material. A driver circuit 712, usually a RF circuit, is used to drive the transducer 710 and to control the frequency and amplitude of the acoustic wave 714. The transducer 710 is engaged on one side of the medium 701. The opposite side of the medium 701 is engaged to an acoustic absorber 720 to absorb the acoustic wave 714 so that little acoustic reflection is produced.

In operation, the input optical beam 731 is directed into the acoustic path of the acoustic wave 714 in the medium 701. The acoustic wave 714 induces a moving grating in the medium 701 that interacts with the input beam 731 to diffract the input beam 731. The grating period of the moving grating varies with the acoustic frequency. When the direction, wavelength of the input wave 731 and the acoustic frequency of the acoustic wave 714 satisfy a phase matching condition in the medium 701, a strong diffracted output beam 732 is produced. This phase matching condition allows the filter 700 as an optical bandpass filter whose center transmission wavelength is dependent on the acoustic frequency of the acoustic wave 714. Hence, the acoustic frequency may be tuned to tune the wavelength of the optical output beam 732. In implementation, the filter 700 is coupled in the fiber ring 101 where the input beam 731 is received from the fiber ring 101 and the output beam 732 is coupled back to the fiber ring 101. The tuning speed of the filter 700 may be on the order of microseconds.

Referring back to FIGS. 1 and 2A, the wavelength locker or wavelocker 129A provides a frequency error signal to indicate the deviation from a frequency reference of the fixed reference Fabry-Perot cavity within the wavelength locker 129A. The wavelength locker 129A may be a single channel wavelength locker which has only one filtering shape and can only be used for one fixed ITU channel. A multi-channel wavelength locker, in comparison, has periodic filtering shapes spaced by a given channel spacing, for example, 100 or 200 GHz, and may be used for locking a tunable laser at different laser wavelengths. A wavelocker with a Fabry-Perot cavity is an example of such a multi-channel wavelength locker.

Figure 8A:
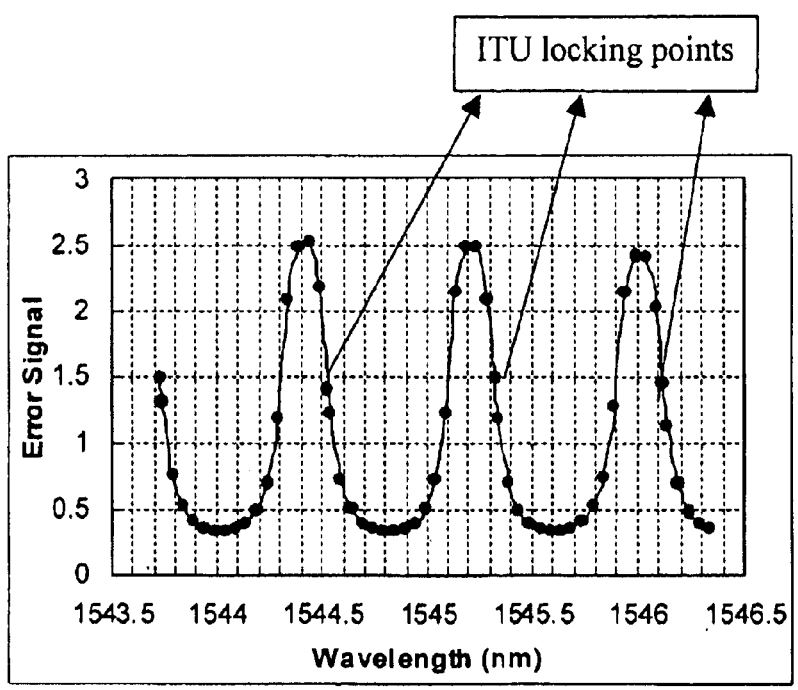
FIGS. 8A and 8B illustrate shifting a locking point of a Fabry-Perot cavity in a wavelength locker used in the wavelength tuning feedback loop in the laser in FIGS. 1 and 2A.

FIG. 8A shows a portion of the error signal from a Fabry-Perot wavelocker as a function of the wavelength where the Fabry-Perot cavity has a period of 100 GHz between two adjacent resonance peaks. Each ITU wavelength/frequency is placed in the middle of the slope of the response curve of each resonance peak. This type of wavelength locker works well for a CW laser with a narrow linewidth.

Figure 8B:
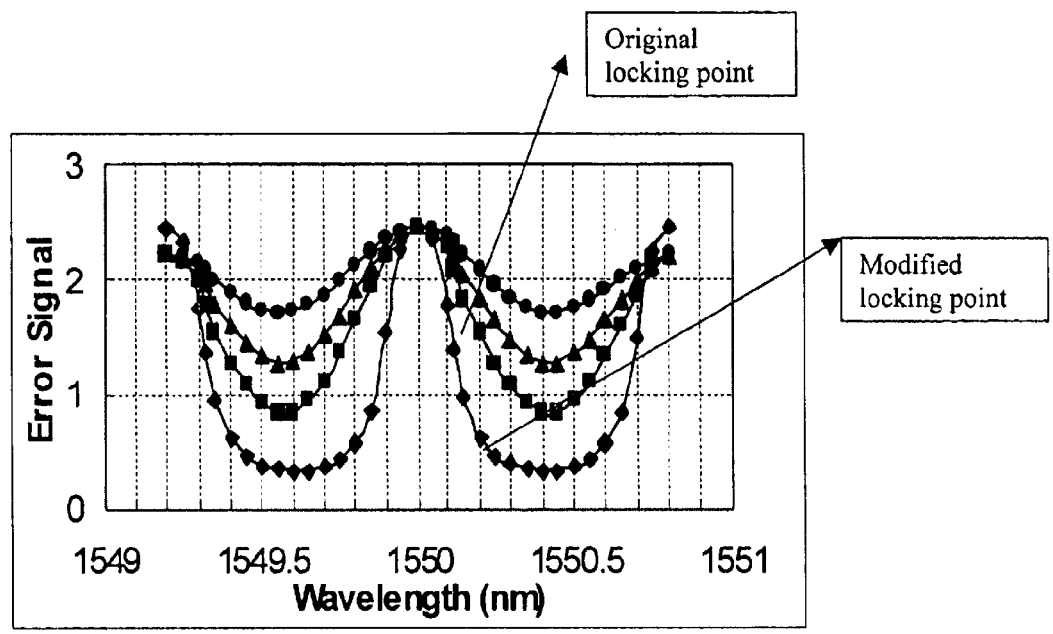

However, when using the wavelength locker for a light source with a broader bandwidth, like an actively modelocked laser shown in FIG. 1, the locking position is shifted close to the peak of the response curve, which in turn makes the locking region narrower on the left or the right side of the working slope (depending on where the locking point is). FIG. 8B shows simulation results in one period of response curves for light sources with different bandwidths at 0.5 nm, 0.4 nm, and 0.3 nm from the top to the bottom where the bottom one is the original response-curve. The original locking point in the middle of the slope is shifted close to the peak when the laser linewidth is broader. The slope of the resonance peak reduces as the locking point is getting close to the peak. This shift in the locking point reduces the sensitivity of the error signal with respect to the change in the laser wavelength and hence compromises the performance of the wavelocker.

In recognition of the above, the Fabry-Perot cavity in the wavelocker should be set to have the ITU locking point close to the valley of the response curve under a narrow linewidth. This is shown in FIG. 8B where the point labeled as Modified Locking Point. The amount of shift from the middle point of the slope is determined by the difference between the narrow linewidth with which the wavelocker is set and the broad linewidth of the laser to be locked. Under this condition, the locking point can be maintained in the middle of the slope for application of light sources with broader bandwidths. The shift of the locking point may be achieved by adjusting of the FP cavity length, setting of the cavity reflectance at a proper value, change of the operating temperature of the wavelength locker, or any combination of those. A shift of 12.5 GHz may be recommended. The modified FP wavelength locker may be used for a wavelength tunable actively mode-locked laser, or other tunable light sources with broad bandwidths.

Tuning of the laser wavelength of an actively mode-locked fiber laser by using an intra-cavity optical tunable filter, such as the bandpass filter 128 in the laser 100 in FIG. 1, may also cause changes in the laser cavity because certain properties of the laser may vary with the laser wavelength. For example; the optical medium within the laser cavity may exhibit chromatic dispersion and hence the group delay varies with the wavelength in the fiber laser. As a result, tuning of the laser wavelength may cause a change in the equivalent cavity optical length due to the variation in the refractive index by the chromatic dispersion. This change in the laser cavity length due to the wavelength tuning, however, may adversely affect the mode locking operation due to the phase matching requirement for the active mode locking.

As described above, in an actively mode-locked laser, the total laser cavity length should produce a mode spacing such that an integer multiple of the mode spacing matches the modulation frequency of the modulator in the laser cavity in order to achieve stable and high-quality short pulses. Therefore, the laser cavity optical length needs to be controlled to maintain the above cavity length condition when tuning the laser wavelength from one value to another value. This control of the cavity length in a fiber cavity may be achieved by using a cavity length control device such as a fiber stretcher or a variable optical fiber delay line. Referring to FIG. 1, the fiber stretcher 140 may be used as a cavity length controller for this purpose. In one implementation, the fiber stretcher 140 may include a PZT drum around which a segment of the fiber is wound and a control voltage is applied to the PZT drum to expand or contract to change the fiber length. Alternatively, an optical medium with a variable index (e.g., an electro-optic or thermal-optic material) may also be used in the cavity, either alone or in combination with the fiber stretcher or the delay line, to provide the desired control. The speed for tuning and locking the actively mode-locked fiber laser is controlled by both the speed of a tunable filter and the speed of fiber length modulation apparatus.

Notably, if the group delay difference between the shortest and longest wavelengths within the tuning range is large, the corresponding fiber length needed to be adjusted in response to the wavelength tuning is also large. This may cause technical difficulties. For example, the required change in the cavity length for a wavelength tuning operation may exceed the tuning range of the cavity length control device such as the fiber stretcher or the optical delay line. Hence, the mode locking condition may not be maintained during the wavelength tuning operation. As a specific example, the commonly-used commercial SMF-28 fiber has a maximum group delay difference of 570 ps/km between 1530 nm and 1565 nm, which corresponds to a relative effective index change of about $4\times10^{-6}$/nm. The maximum relative displacement for a certain PZT fiber length modulator may be limited up to $5\times10^{-5}$. Therefore, the maximum wavelength tuning range in this case is limited to be $5\times10^{-5}/4\times10^{-6}$ nm=12 nm. In general, to achieve a full range of wavelength tuning with a PZT drum, the maximum group delay difference may be limited to be smaller than 200 ps/km.

As another example, if the required change in the cavity length for a wavelength tuning operation is within the tuning range of the cavity length control device, the operation of changing the cavity length by the cavity length control device may take time and hence limit the overall tuning speed.

Hence, for at least the above reasons, it is desirable to reduce the effective chromatic dispersion within the laser cavity. The maximum group delay difference within the wavelength tuning range of the mode-locked laser may be reduced by either using a specialty fiber in the cavity or combining two or more fibers with different group delay properties. Both the requirement of the wavelength tuning range and the tuning speed may be achieved by manipulating the fiber combination used for the laser cavity. For example, if a maximum group delay difference of 20 ps may be achieved, which is assumed to be ten times below the maximum permissible group delay for the cavity length adjustment, the tuning voltage range of the PZT drum may be reduced by approximately ten times at the same slew rate. This in turn may significantly increase the speed of both wavelength tuning and mode locking of the laser.

In combining two or more fibers with different group delay properties, two fibers with chromatic dispersions of opposite signs may be used in the fiber cavity. The length and magnitude of the chromatic dispersions of the two different fiber segments are predetermined ir the design of the laser. For example, in FIG. 1, the fiber segments 111 and 112 may be designed to have the same amount of chromatic dispersion with opposite signs so that the total dispersion is substantially cancelled out or near zero.

Figure 9:
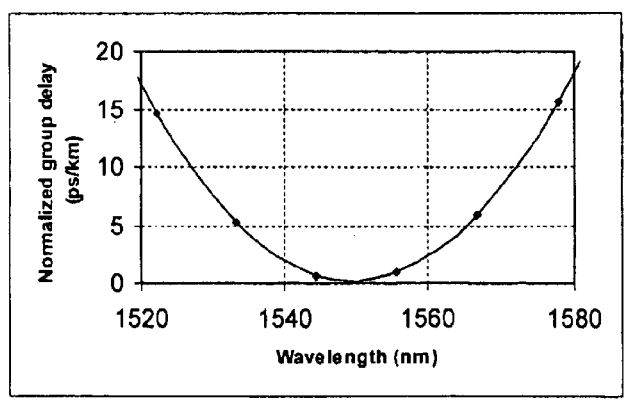
FIGS. 9, 10, 11A, 11B, and 12 show performance parameters of an actively mode locked fiber ring laser formed of two different fiber segments to reduce the overall chromatic dispersion in the fiber ring based on the design in FIG. 1.

FIG. 9 shows a simulated result of an example for a fiber ring cavity with a combination of an SMF 28 fiber and a dispersion compensation fiber (DCF) which may be a piece of a Erbium doped fiber. By carefully selecting the lengths of the two fibers, the maximum group delay difference (normalized) may be well controlled within 2C ps/km. Based on the laser cavity requirement, other types of fibers may also be used to obtain similar or better performance. This approach may apply to both PM fiber based mode-locked ring fiber laser as shown in FIG. 1 and non-PM fiber based mode-locked sigma fiber laser as described in a later section of this application.

Figure 10:
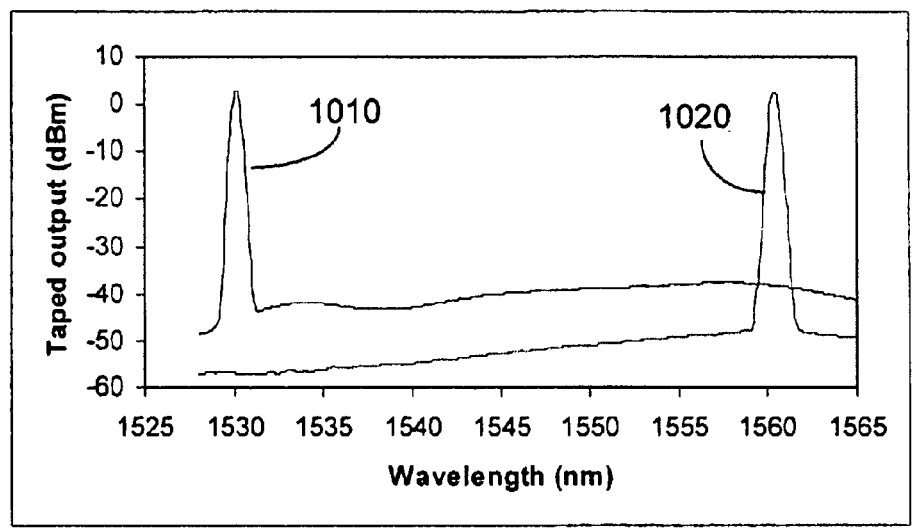
Figure 11A:
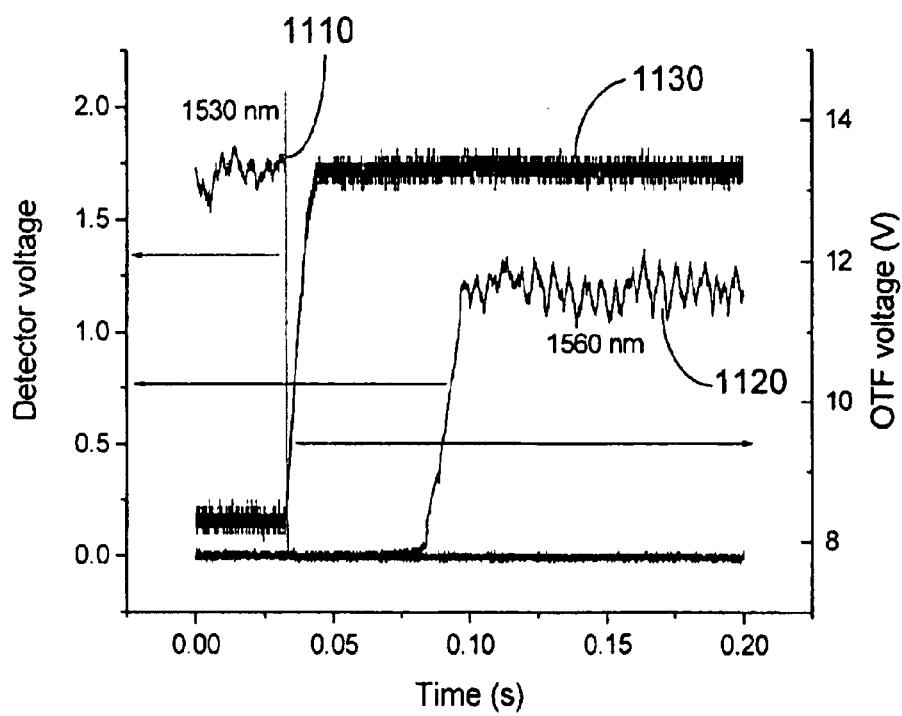
Figure 11B:
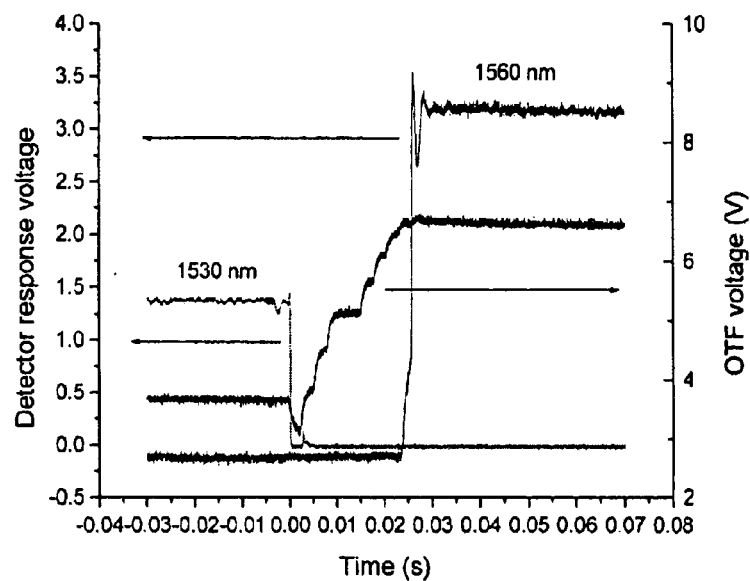
Figure 12:
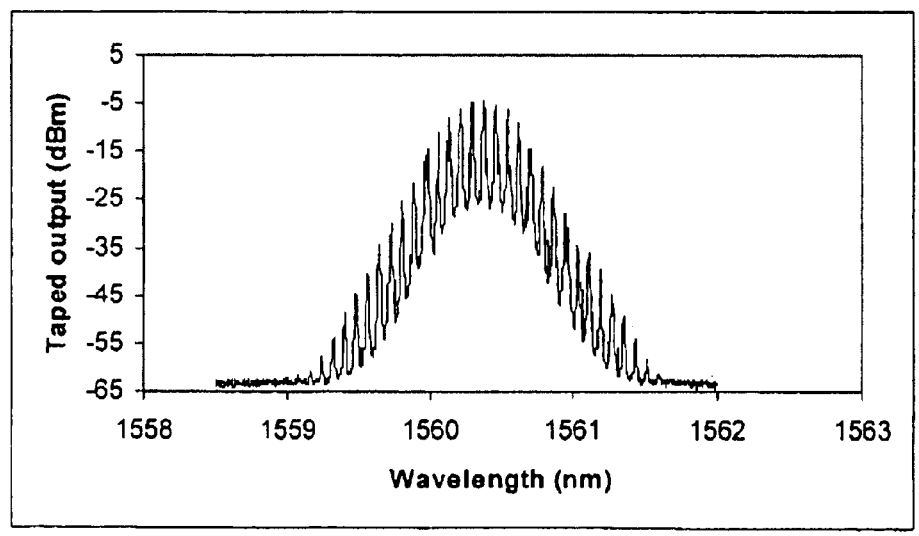

Measurements have been obtained in a prototype fiber ring laser based on the design in FIG. 1 where the ring 101 includes a 20-m PM EDF in the fiber segment 110 and a 50-m Panda PM fiber in the fiber segment 112. A PZT fiber stretcher is used in this laser to modulate the fiber length for compensation of both temperature and wavelength change. A fiber tap coupler is used to couple part of the output light to two 100-GHz channel spacing WDM Demux units or wavelength-selective optical couplers respectively at 1530 nm and 1560 nm. Two optical detectors are used to measure the output signals from the two WDM Demux units to obtain the settling times of the tunable mode-locked fiber laser at 1530 nm and 1560 nm, respectively. FIG. 9 shows the simulated normalized group delay of the composite fiber ring as a function of the laser wavelength. FIG. 10 shows the measured optical spectra represented by curves 1010 and 1020 over a spectral range from about 1530 nm to about 1560 nm when the laser is tuned and locked at 1530 nm and 1560 nm, respectively. FIG. 11A shows the switching and settling time of the fiber laser when the channel wavelength is tuned from 1530 nm to 1560 nm, where the curve 1110 is the detector voltage representing the laser power at 1530 nm before the tuning operation and the curve 1120 is the detector voltage representing the laser power at 1560 nm after the tuning operation. The laser wavelength at 1560 nm is locked and stable after about 70 ms of switching the voltage on the tunable optical filter. The curve 1130 shows the switching voltage on the tunable optical filter in the fiber cavity. This switching time can be shortened by improving the tunable bandpass filter 128 in the laser. FIG. 11B shows the switching and settling time of the fiber laser based on an improved driving circuit for the PZT actuator on the tunable filter 128 when the channel wavelength is tuned from 1530 nm to 1560 nm. A settling time of less than 30 ms is achieved for a tuning range over 30 nm and the amplitude noise is less than about 1.5%. FIG. 12 further shows the detailed mode-locked spectrum of the laser at the channel of 1560 nm.

The above example of combing two different fibers in the fiber cavity demonstrates that, the optical chromatic dispersion in the fiber ring 101 may be reduced to a desirable small amount by design, e.g., using low-dispersion optical materials. When the dispersion of the fiber ring 101 is unacceptable, a dispersion compensating fiber segment 112 may be included in the fiber ring 101 to produce an optical chromatic dispersion that negates the chromatic dispersion in the fiber ring 101 caused by other fibers and the fiber gain segment 110. In addition to reduce the dispersion to allow for tuning of the laser wavelength, this dispersion compensating fiber segment 112 may be configured to operate the laser in two different modes. In the first mode, the fiber 112 is designed to reduce or minimize the overall dispersion in the fiber ring 101 and hence to shorten the pulse width. In the second mode, the fiber 112 is designed to provide a condition where the self-phase modulation and the group velocity dispersion are balanced to produce optical solitons rather than regular optical pulses. As illustrated, the dispersion compensating fiber segment 112 may include two fiber segments DSF1 and DSF2 with opposite dispersions to achieve a desired net dispersion in the ring 101. This dispersion management can also reduce the pulse width of the optical pulses by the laser.

It is also contemplated that, an adjustable dispersion control unit that varies the chromatic dispersion of the laser cavity, may be placed in a suitable location within the laser cavity to manage or control the net dispersion of the laser cavity. This mechanism may be used alone or in combination with the use of two or more fibers with different dispersions in the fiber laser cavity. A tunable fiber grating coupled with an optical circulator, for example, may be used as the dispersion control unit to receive the laser beam and modify the dispersion of the received laser beam (e.g., a linearly or nonlinearly chirped grating). In another example, a reflective grating with a fiber pigtail for connection in the fiber cavity may also be used.

The following sections describe the active cavity control mechanism in the tunable actively mode-locked lasers according to various embodiments of this application. As described above, the total optical path length of the laser cavity should be controlled to satisfy the phase matching condition for the active mode locking. Chromatic dispersion in the laser cavity, even under dispersion management as described above, may cause the total optical path length to change with the tuning of the laser wavelength. Hence, the cavity length needs dynamic adjustment to compensate such change due to dispersion. In addition, the geometry of the laser cavity may change with respect to other factors, such as environmental conditions (e.g., temperature or vibrations) and its own aging process. One notorious factor is a change in the cavity length due to the thermal expansion. Because of the above wavelength tuning and other effects, it is desirable to provide an active control mechanism for dynamically adjusting the cavity length.

The active cavity length control mechanism may be designed to provide both a slow control mechanism to correct slow changes in the cavity geometry, e.g., caused by the temperature drift, and a fast control mechanism to correct sudden changes in the cavity geometry, e.g., caused by the wavelength tuning operation in adjusting the tunable filter 128, by vibrations, or by certain processes in the gain medium. The slow control mechanism may also be used to bias the optical cavity so that the operating point of the fast control mechanism is set within the operating range to allow for control in both directions.

The cavity length controller 140 shown in FIG. 1 is one implementation of or one part of the fast cavity control mechanism. It may include a piezo-electric transducer to adjust the physical length of the laser cavity in response to the control signal 141. The fast control mechanism may also include a high-speed thermal control over a small section of the optical cavity. The optical output of the laser may be monitored by using an optical detector to convert a fraction of the laser output into an electronic monitor signal. A laser control unit may then be used to process this monitor signal to produce the fast control signal 141. As will be described below, a bias stretch produced by the transducer may also be used to adjust the bias of the laser cavity or to operate as a slow control mechanism or as part of the slow control mechanism.

The slow control mechanism may be implemented by enclosing at least a portion of the laser cavity within a thermally-controlled chamber so that the temperature of this portion of the laser cavity is kept at a constant as the surrounding temperature changes by either heating up the chamber or extracting heat from the chamber. The chamber may be formed of a thermal insulating material to insulate the enclosed portion from the environment. One or more temperature sensors may be used within the thermally-controlled chamber to measure and monitor the temperature of the laser cavity. Two or more such sensors may be used to increase the accuracy in determining the average temperature of the enclosed portion of the optical cavity. The temperature control controls the optical path length of the enclosed portion of the optical cavity by controlling both the refractive index and the physical length. When the enclosed portion is a fiber segment, the change in the optical path length caused by the temperature-induced index change may be greater than that caused by the temperature-induced changed in the physical length.

The following describes the details of the cavity length control mechanism according to one embodiment.

Figure 13:
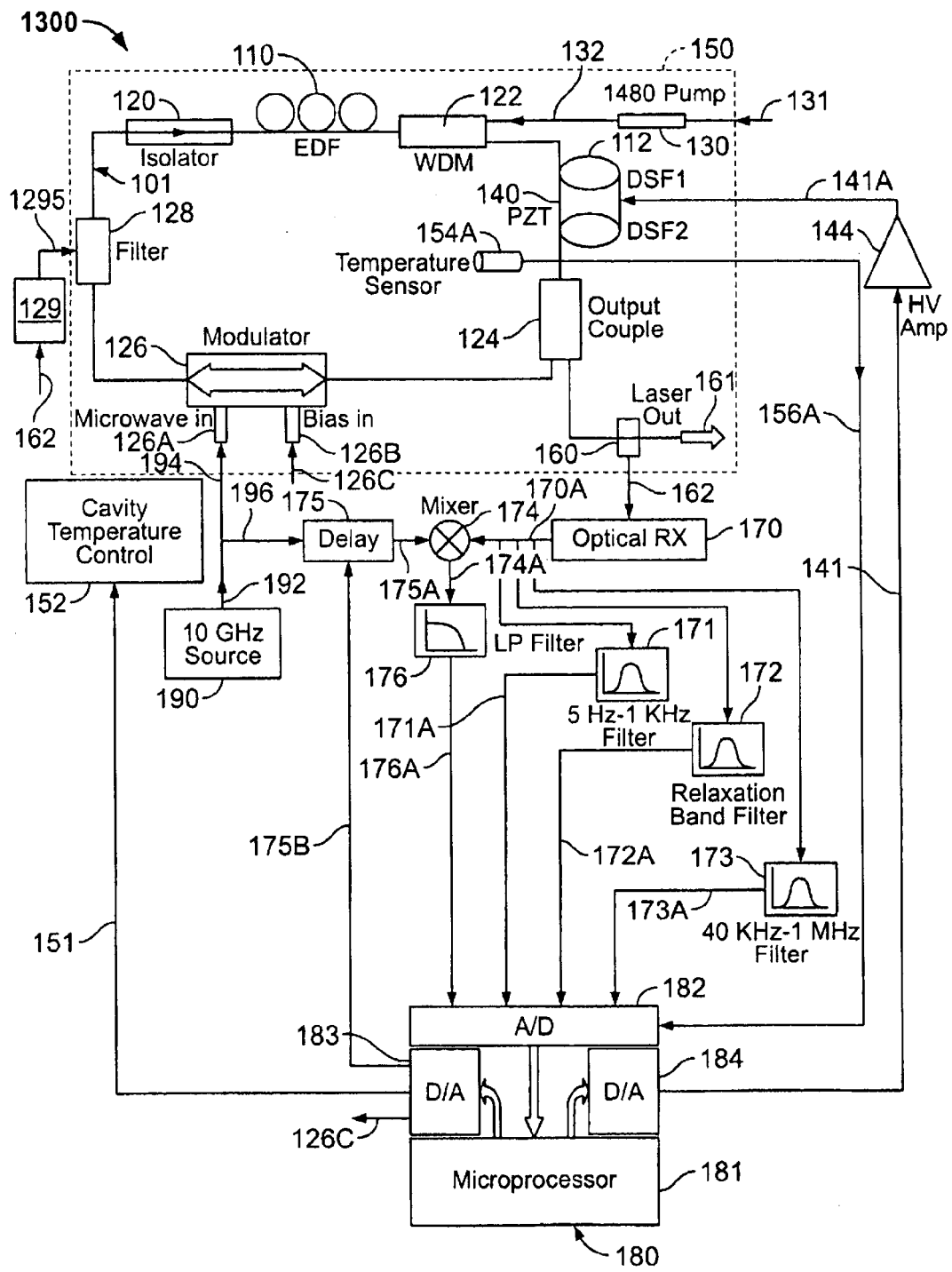
FIG. 13 shows one embodiment of an actively mode-locked fiber laser in a ring cavity design with a dynamic cavity length feedback control.

FIG. 13 shows one embodiment of an actively mode-locked fiber laser 1300 that uses fiber segments to form the closed fiber ring or loop 101 and a dynamic cavity length control feedback system with a digital control module 180. The wavelength tuning feedback loop part for laser 1300 is similar to that shown in FIG. 1 and thus is not shown here for simplicity. Various parts of the laser 1300 have been described in the laser in FIG. 1. The modulator 126 may include a driver input port 126A for receiving the control signal 194 at the modulation frequency and a bias input port 126B for receiving a bias control signal 126C. A modulator driver 190, such as a RF signal generator or synthesizer, is used to produce the modulator control signal 194 to drive the optical modulator 126. The control signal 194 may be a RF signal at a desired frequency, e.g. tens of GHz, such as 10 GHz, 40 GHz or higher, depending on the requirements of applications. To obtain stable and high-quality short pulses in the laser 1300, the total laser cavity length should produce a mode spacing such that an integer multiple of the mode spacings matches the modulation frequency of the modulator 126 with a high accuracy, e.g., a relative deviation less than $10^{-7}$. The digital feedback control in the laser 1300 is designed to adjust the length of the fiber the ring 101 to maintain this phase matching condition.

Notably, the bias of the modulator 126 may also affect the phase matching condition and thus should be maintained by the digital feedback control loop at a certain bias value. This bias value sets the operating point in the transfer function of the modulator 126. The bias control signal 126C, as described below, may be generated by the digital feedback control and used as one of control parameters for controlling the laser 1300.

For example, when a Mach-Zehnder amplitude modulator is used as the modulator 126, the transfer function is a sinusoidal function of the bias voltage due to the interference of light from the two different optical paths. For purpose of mode locking of the laser 1300, the bias should be set adjacent to the bias voltage $V_{B0}$ where a complete destructive interference occurs to produce an output minimum. Typically, the DC bias may be set as close as possible to $V_{B0}$ to achieve a large time derivative of the slope of the transmission of the modulator as a function of time, i.e., the second derivative of the transmission with respect to time. Under this condition, the mode-locked pulses are discovered to be narrow and stable. On the other hand, the bais voltage should be sufficiently deviated from $V_{B0}$ to avoid mode locking at the second harmonic frequency of the driving modulation frequency in order to achieve stable mode locking at the modulation frequency. For a given Mach-Zehnder modulator where the half-wave voltage is $V_\pi$, the bias voltage may be set at $V_{bias} \approx V_{80} \pm V_{80} \pm V_\pi/10$ range.

The bais of the optical modulator 126, however, may drift away from the desired point in the transfer function. Such a drift in a Mach-Zehnder modualtor, for example, is known to be caused by various factors. This drift may adversely affect the mode-locking of the laser 1300 and to increase the noise in the laser output. Hence, as will be described in lase sections, the digital feedback control may be designed to monitor such drift and to correct the drift to maintain the proper bias during operation of the laser 1300.

The optical dispersion in the fiber ring 101 may be reduced to a desirable small amount by design, e.g., using low-dispersion optical materials. When the dispersion of the fiber ring 101 is unacceptable, a dispersion compensating fiber segment 112 may be included in the fiber ring 101 to produce an optical chromatic dispersion that negates the chromatic dispersion in the fiber ring 101 caused by other fibers and the fiber gain segment 110. This dispersion compensating fiber segment 112 may be configured to operate in two different modes. In the first mode, the fiber 112 is designed to reduce or minimize the overall dispersion in the fiber ring 101 and hence to shorten the pulse width. In the second mode, the fiber 112 is designed to provide a condition where the self-phase modulation and the group velocity dispersion are balanced to produce optical solitons rather than regular optical pulses. In both modes, the chromatic dispersion for the ring 101 should managed to allow the cavity length control to maintain the phase matching condition during tuning of the laser wavelength. As illustrated, the dispersion compensating fiber segment 112 may include two fiber segments DSF1 and DSF2 with opposite dispersions to achieve a desired net dispersion in the ring 101. In addition, a dispersion element may be inserted in the ring 101 to control the dispersion as described above.

The laser 1300 uses a thermally controlled chamber or housing 150 to enclose and thermally stabilize the fiber ring 101 at or near a desired cavity temperature as the surrounding temperature changes by either heating up the chamber or extracting heat from the chamber. A temperature control unit 152 is thermally coupled to the chamber 150 to actively control the temperature of the fiber ring 101 in response to a control signal 151. In some implementations, the cavity temperature is usually kept higher than the temperature of the surroundings. The temperature control unit 152 may include an adjustable electrical heating element or a thermal electrical element which may operate to heat or cool. One or more temperature sensors 154A are distributed in the chamber 150 to measure the temperature therein. The sensor signal 156A rom the temperature sensor 154A is fed to the digital control module 180 of the laser 1300 that generates the control signal 151 based on the signal 156A. This forms one active control loop in the laser 1300.

This thermal control mechanism may be used as part of the slow control mechanism to mitigate any variation in the total cavity length caused by a change in temperature to assist maintenance of the phase-matching condition for mode locking. In addition, the thermal control mechanism may also operate as a bias mechanism to set the total cavity length at a desired bias value so that the operating point of the fast control mechanism is set within the operating range to allow for control in both directions.

The laser 1300 also has a cavity length controller 140, such as a fiber stretcher coupled in the fiber ring 101, e.g., at the fiber segment 112, to control the overall optical path length of the fiber ring 101 against fluctuations that cause noise in the laser output and degrade the mode-locking phase-matching condition. The fiber stretcher 140 operates to change the length of the fiber segment to which it is engaged at a speed higher than the thermal control chamber 150 to provide a high-speed adjustment to the cavity length. A control signal 141A, which is initially generated from the digital control module 180 as a control signal 141 and is amplified by a high-voltage amplifier 144, is used to control the operation of the fiber stretcher 140. This forms the second control loop of the laser 1300 and operates as the fast control mechanism. The control signal 141A may include an AC signal portion to dither the fiber stretcher 140 to control the overall cavity length at a desired value to maintain the mode-locking phase-matching condition and to minimize the output noise. In one implementation, a piezo-electric transducer (PZT) may be used as the fiber stretcher, where different PZT voltages of the fiber stretcher correspond to different values of the cavity length. The fiber stretcher 140 is generally enclosed in the chamber 150. The fiber stretcher 140 may also be coupled to control the physical length of the gain fiber 110. Both fiber segments 110 and 112 may be actively controlled by fiber stretchers as the fast control mechanism.

In addition, similar to the thermal control, the fiber stretcher 140 may be biased by a DC signal portion in the control signal 141A to cause a bias stretch in the fiber ring 101 to set the total cavity length at a desired value so that the operating point of the fast control mechanism is set within the operating range to allows for control in both directions. At or near this bias stretch point, the fiber stretcher 140 may be operated to adjust the total length of the fiber ring 101 at a high speed to compensate for laser noise and fluctuations. This bias stretch may be tuned by the digital control module 180 as another slow control mechanism. Either or both of the temperature of the chamber 150 and this bias stretch control may be used to provide the slow control-mechanism to correct slow or long-term drifting of the total cavity length.

The performance of the laser 1300 is monitored by using an optical detector 170 to convert the optical monitor signal 162 into an electronic monitor signal 172. This optical-to-electronic interface provides a common feedback for different control loops in the digital feedback control system, including the thermal control, the fiber stretcher 140, the modulator bias, and a phase delay in another feedback signal to the digital control module 180 as will be described below.

The digital feedback control system for the laser 1300 includes the digital control module 180, an electrical delay unit 175, an electrical signal mixer 174, a low-pass filter 176 and one or more electrical bandpass filters 171, 172, 173. The digital control module 180 is the backbone of the control system and includes a digital processor 181 and circuit interface with the analog part of the feedback control system such as the bandpass filters, the delay unit 175, the bias port 126B of the modulator 126, the thermal control 152, and the fiber stretcher 140. As illustrated, the circuit interface may include an analog-to-digital circuit 182 (e.g., an array of analog-to-digital converters) for converting feedback analog signals into digital signals to be processed by the digital processor 181. Digital-to-analog converters 183 and 184 are also included to convert the control signals produced by the digital processor 181 into analog signals for operating different control elements in the laser 1300. The digital processor 181 may be a suitable microprocessor that has a non-volatile memory for storing laser control parameter data and can be programmed to execute the operations as outlined below.

The following sections will first describe feedback mechanisms of the control system and then the control operations under the control of the digital processor 181 based on the information from the feedback signals.

The digital control module 180 receives feedback signals from the laser cavity in a number of ways. The optical detector 170 coverts the optical monitor signal 162 into an electrical detector signal 170A. This electrical detector signal 170A is split into several signals which are then processed electronically in different ways to produce different feedback signals to the digital control module 180.

The first feedback signal 176A to the digital control module 180 is produced by the mixer 174 and the low-pass filter 176 as a phase detector. A reference signal 196 is produced by splitting a portion out of the modulation signal 192 to mix with a portion of the detector signal 170A to produce a mixed signal 174A. The reference signal 196 oscillates at a reference frequency, i.e., the modulation frequency of the optical modulator 126. Hence, the lowest frequency term in the mixed signal 174A is the signal component with a phase that represents the frequency difference between the modulation frequency and the multiplicity of the longitudinal mode spacing of the laser cavity. This signal component oscillates sinusoidally at the above frequency difference. The low-pass filter 176 filters out other signal components with higher oscillating frequencies and selects the above signal component as the filtered output signal 176A. The low-pass filter 176 may be configured to set its cutoff frequency according to the frequency difference to be corrected by the control system, i.e., the tuning range of the cavity length. For example, this cutoff frequency may be on the order up to the kilo hertz range, such as 5 to 6 KHz.

Hence, the digital processor 181 may be programmed to process the phase of the filtered output signal 176A to determine the deviation of the cavity length from the desired phase-matched cavity length and the direction of such deviation. Hence, the filtered signal 176A provides an error signal for the control system to detect the error in the cavity length. Accordingly, based on the detected error, the digital processor 181 is programmed to generate the control signal 141 to adjust the cavity length to reduce the error to maintain the mode-locking condition after the mode-locking condition is established.

The above operation for maintaining the mode-locking condition in the laser is one of a number features implemented in the digital feedback control. The digital feedback control may be designed to perform complex digital processing of information contained in the detector signal. 170A to obtain information on the laser in addition to the phase information in the signal 176A for controlling other aspects of the laser 1300.

For example, the filtered signal 176A from the output of the mixer 174 is a sinusoidal signal with respect to the phase difference between the signals 175A and 170A. The amplitude of the slope of the signal 176A is largest when the phase difference is set a selected value so that the amplitude of the signal 176A is at zero. If at this selected phase difference value, the mode-locking phase-matching condition is met, the amplitude of the signal 176A would be most sensitive to the deviation of the cavity length from the phase-matched cavity length. Therefore, the phase delay of the phase delay unit 175 may be adjusted to set the amplitude of the signal 176A to zero when the phase locking phase matching condition is satisfied. To achieve a sensitive feedback control, this condition at the mixer should be checked during the normal operation of the laser and the phase delay unit 175 should be adjusted to restore that condition should the mixer drifts away from this desirable condition. As will be described below, the digital processor 181 is programmed to use information obtained from feedback signals other than the signal 176A to adjust the phase delay unit 175. This is because the signal mixing by the mixer 175 and the low-pass filtering by the filter 176 eliminate certain useful information on the laser from the signal 176A and thus the digital processor 181 cannot have sufficient information based on the signal 176A alone to properly control the phase delay unit 175.

For another example, digital processor 181 may also programmed to adjust the bias in the optical modulator 126 to maintain the proper bias condition as previously discussed. Similar to the control of the phase delay unit 175, the digital feedback control may be designed to monitor and correct the bias drift based on information obtained from feedback signals other than the signal 176A.

Furthermore, the digital feedback control may be programmed to adjust the laser from a non-mode-locking condition to a mode-locking condition when the laser is initially not mode locked. Under the non-mode-locking condition, the signal 176A generally fluctuates randomly and hence does not provide useful information about the laser. Therefore, information obtained from feedback signals other than the signal 176A have to be supplied to the digital processor 181 to set laser parameters to either establish the mode lock for the first time or to restore the mode lock that was previously achieved.

To achieve the above and other control functions, the control system in the laser 1300 is designed to use one or more electrical bandpass filters to provide additional feedback signals to the digital control module 180. More specifically, the laser 1300 provides bandpass filters 171, 172, and 173 connected in parallel at different spectral ranges to obtain different filtered signals 171A, 172A, and 173A, respectively, from the common detector output signal 170A. Such filtered signals include noise and other information of the laser. The filter 171 is designed to have a transmission band at a low frequency range to monitor the low-frequency spectral components in the laser output, e.g., 5 Hz to 1 KHz for a fiber ring laser. The filter 172, also called "energy relaxation filter", is designed to have a transmission band at a middle frequency range to monitor the spectral signals mainly associated with energy relaxation processes in the laser cavity, e.g., the frequency corresponding to the inverse of the laser cavity decay time. In some fiber ring lasers, this range may be from 30 KHz to 36 KHz or in a wider range from 5 KHz to 50 KHz. The filter 173 is designed to have a transmission band at a high frequency range to monitor the high-frequency spectral signals in the laser output, e.g., 40 KHz to KHz for a fiber ring laser. The above use of the three bandpass filters to cover the low, middle and high frequency range of the laser output is just an example and more filters may be used to further divide the spectrum. Such filter output signals are used by the digital processor 181 to extract vital information on the state of the laser that may otherwise not available from the filtered signal 176A. In particular, these filter output signals include information on the noise of the laser output and thus may be used to control the bias on the optical modulator 126, the phase delay unit 175, and adjust the laser from a non-mode-locking condition to a mode-locking condition.

Another feedback signal is the signal 156A from the temperature sensor 154A that represents the temperature within the thermal chamber 150. This signal 156A may be used in at least two operations. First, it allows the digital processor 181 to determine the difference between the actual temperature and a desired temperature and thus controls the thermal control 152 accordingly to correct any temperature deviation. Secondly, the signal 156A allows the digital processor 181 to control the thermal control 152 to set the chamber 150 to a desired new temperature to properly bias the total cavity length.

The digital processor 181 is designed to have control intelligence by being programmed based on at least the following three operation algorithms: achieving mode-lock for the first time, achieving mode-lock not for the first time, and maintaining mode-lock.

The operation algorithm for achieving mode-lock for the first time includes the following steps.

1. Set the temperature at the middle of the operational temperature range. Note that this may also be achieved by either biasing the fiber stretcher 140 with a DC PZT voltage or controlling the temperature of the thermal control chamber 150, or a combination of both.

2. Under the proper bias in the modulator 126, the PZT voltage in the fiber stretcher is swept through its whole tuning range, while recording the output signals of the bandpass filters 171, 172, and 173.

3. Search through the collected data from all the filters 171, 172, and 173 to look for a mode-lock minimum value for the PZT voltage. If the proper bias in the modulator 126 is uncertain, then the bias in the modulator 126 may be scanned at each PZT voltage to collect the output data from the bandpass filters. The filter output as a function of both the PZT voltage and the modulator bias may be digitally processed to search form the values for the PZT voltage and the modulator bias where the filter output energy is minimized.

4. If there is a potential mode-lock minimum, further analyze the relaxation filter data obtained from the filter 172 by running a "resolve minimum" sub routine shown in FIG. 14. If steps 3 and 4 do not agree then a mode-lock minimum is treated as out of the range within the current PZT voltage sweep. Under this condition, the temperature setting is changed to another value to repeat the procedures from steps 2–4. If steps 3 and 4 arrive at the same value or the approximately the same value in the PZT voltage, then a mode-lock minimum exists around the neighborhood of that PZT value.

5. The fiber stretcher 140 is set to be biased at a DC voltage of the above PZT value. Optionally, another "find minimum" sub routine in FIG. 15 may be executed to search for the real minimum PZT voltage in the vicinity of the PZT value for the mode-lock minimum in step 4. The DC bias voltage on the fiber stretcher 140 is set at this value.

6. Apply an AC modulation signal on the PZT to dither the PZT voltage around the minimum PZT voltage to keep the relaxation energy in the output 172A of the filter 172 to a minimum. This should also set the energy in the output signal 171A from the filter 171 and the output signal 173A from the filter 173 at their minimums.

7. Under the condition in step 6, the microwave phase delay 175 is adjusted so the mixer output 176A after the low-pass filter 176 is zero to establish the mode-locking condition.

8. Resolve the ambiguity in the slope of the mixer output signal 176A and use the resulted signal as the feedback error for the next step. This ambiguity resolution is to determine the relationship between the direction of the adjustment to the cavity length and sign of the frequency difference between the modulation frequency and the multiplicity of the longitudinal mode spacing of the laser cavity. This relationship is affected by the operating bias point in the Mach-Zehnder modulator 126 relative to the bias point for the complete destructive interference at the modulator output in absence of the RF modulation signal.

9. Adjust the temperature of the laser cavity so that the PZT voltage remains close to the center of its range.

10. Save the mode-lock parameters such as the minimum PZT voltage, the temperature of the laser cavity, and phase delay settings in a non-volatile memory of the digital processor 181.

The operation algorithm for achieving mode-lock not for the first time includes the following steps.

1. Load the previously saved mode-lock parameters from the memory to the digital processor to drive the system to those settings.

2. Sweep the PZT voltage through a small range, while recording the output signals of the bandpass filters 171, 172, and 173.

3. Search through the collected data from all the filters looking for a mode-lock minimum value for the PZT voltage.

4. If there is a potential mode-lock minimum further analyze the relaxation filter data by running the "resolve minimum" sub routine in FIG. 14.

If steps 3 and 4 do not agree then a mode-lock minimum was not within this partial PZT voltage sweep, widen the PZT voltage sweep and repeat the procedure from step 2. If steps 3 and 4 arrive at the same answer, then a mode-lock minimum exist around the neighborhood of that answer. In addition, the optional "find minimum" sub routine in FIG. 15 may be executed to find the real minimum PZT voltage.

5. While dithering the PZT voltage to keep the relaxation energy to its minimum, adjust the microwave phase delay so the mixer output is zero.

6. Adjust the temperature so that the PZT voltage remains close to the center of its range.

7. Save the mode-lock parameters such as the minimum PZT voltage, temperature and phase delay settings in the non-volatile memory to replace previous mode-lock parameters.

Upon establishing the mode-lock condition by performing the operations in either of the above operation algorithms, the digital processor 181 is instructed to carry out the following phase-lock operation algorithm for maintaining the mode-locking condition:

1. Switch the PZT voltage control loop from minimizing the relaxation energy in the output signal from the filter 172 and other filters 171 and 173 to minimizing the mixer output 176A; and 2. Periodically execute the following sub-routine: (1) momentarily switch the PZT voltage control loop back to minimizing the mixer output 176A; (2) minimize the relaxation energy in the output of the filter 172; (3) adjust the phase delay to keep the mixer output at zero; and (4) adjust the cavity temperature to maintain the PZT voltage close to the center of its operating range. This sub-routine is to correct any deviation from the desired phase delay between the signals 175A and the signal 170A for sensitive feedback control on the cavity length.

As noted previously, the bias in the modulator 126 may drift from the desired bias value, e.g., $V_{bias} \approx V_{B0} \pm V_x/10$. Hence, the above phase-lock operation algorithm may further include a subroutine for periodically monitoring the bias and readjusting the bias signal 126C to the modulator 126 to reduce any deviation from the desired bias condition. The initial bias voltage 126C may be determined by observing the output of the modulator 126 in absence of the modulation signal 194 by tuning the bias 126C. This procedure, however, is not applicable during operation of the laser 1300 in the mode-locking condition because the removal of the modulation signal 194 can destroy the mode lock operation and thus interrupt the laser operation. This bias control subroutine is designed to operate while maintaining the normal mode-locked operation of the laser.

First, the PZT control loop is momentarily switched from minimizing the mixer output 176A to minimizing the relaxation energy in the filter output 172A and the energy in signals 171A and 173A. Second, the PZT voltage is set at a DC value where the relaxation energy is minimized. Third, the bias signal 126C is adjusted to settle at a value where the relaxation energy in the filter output 172A is minimized. Fourth, the temperature of the chamber 150 is adjusted to set the PZT voltage at the center of its operating range. Fifth, the PZT control loop is switched back to minimizing the mixer output 176A.

The time interval for executing either of the phase delay subroutine and the bias subroutine is determined by the drift characteristic time of the laser. The bias subroutine, for example, may be executed every several hours or so for some electro-optic Mach-Zehnder modulators.

Figure 14:
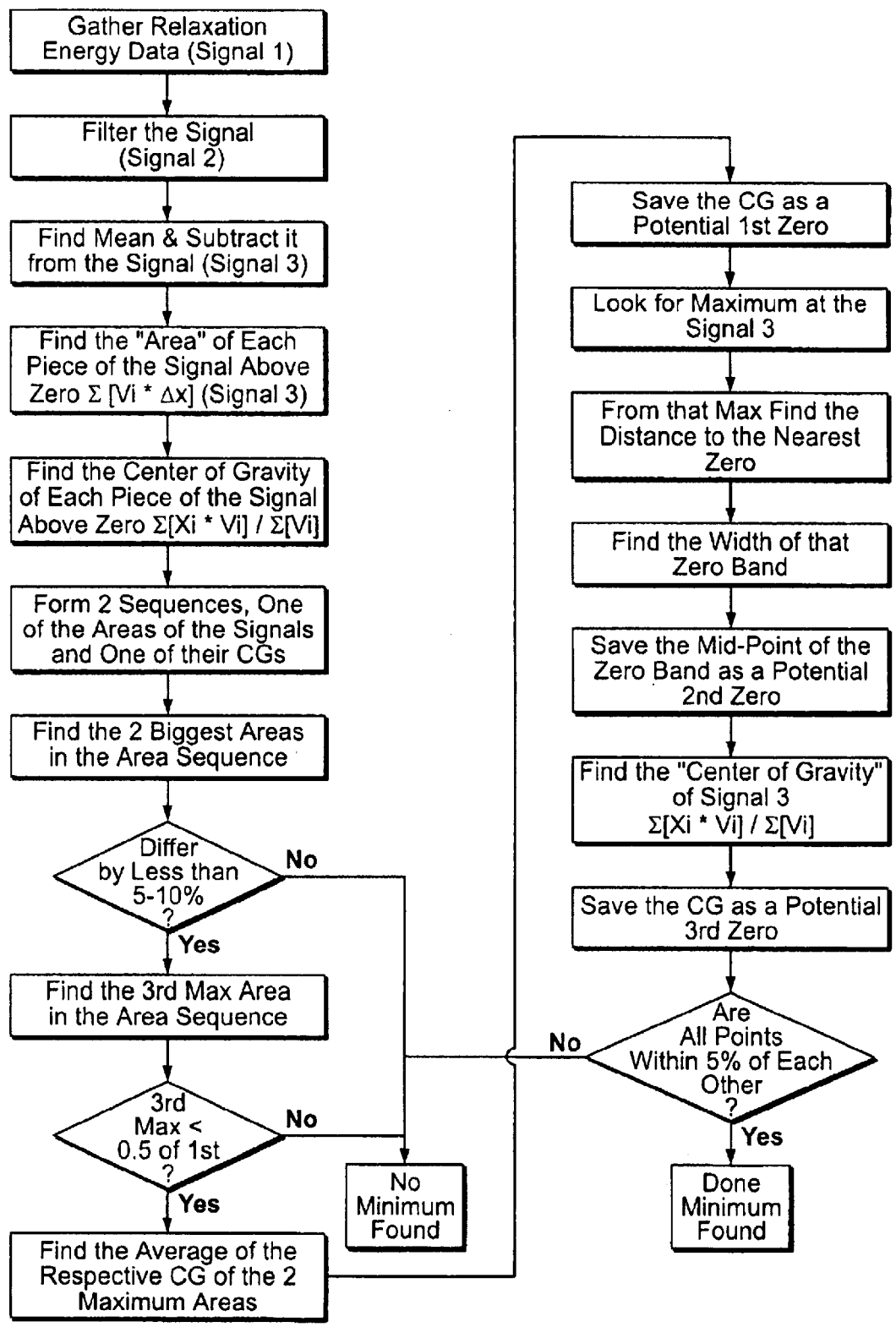
FIGS. 14 and 15 show two operations of the digital processor in the cavity length feedback control in FIG. 13.
Figure 16A:
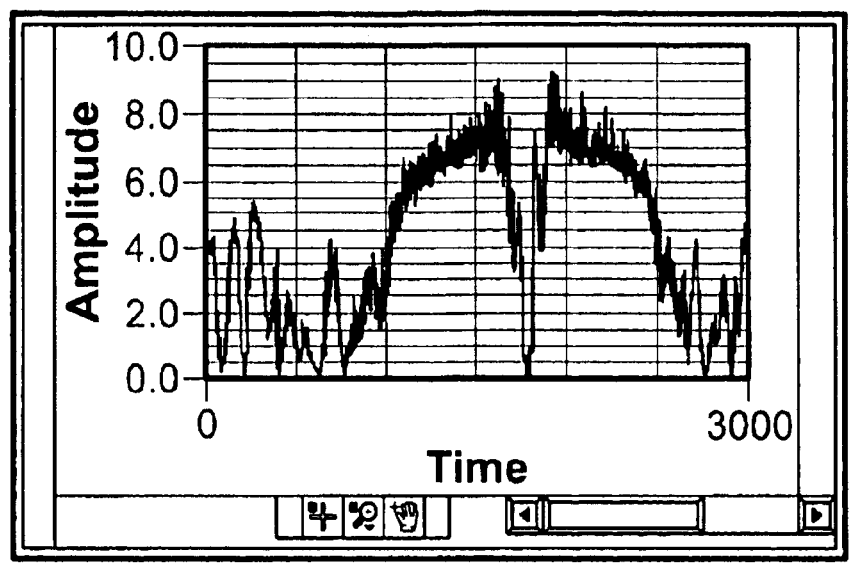
FIGS. 16A, 16B, and 16C show a measured signal from a bandpass filter of the laser in FIG. 13 where the laser has a mode locking condition within the operating range of the PZT fiber stretcher.
Figure 16B:
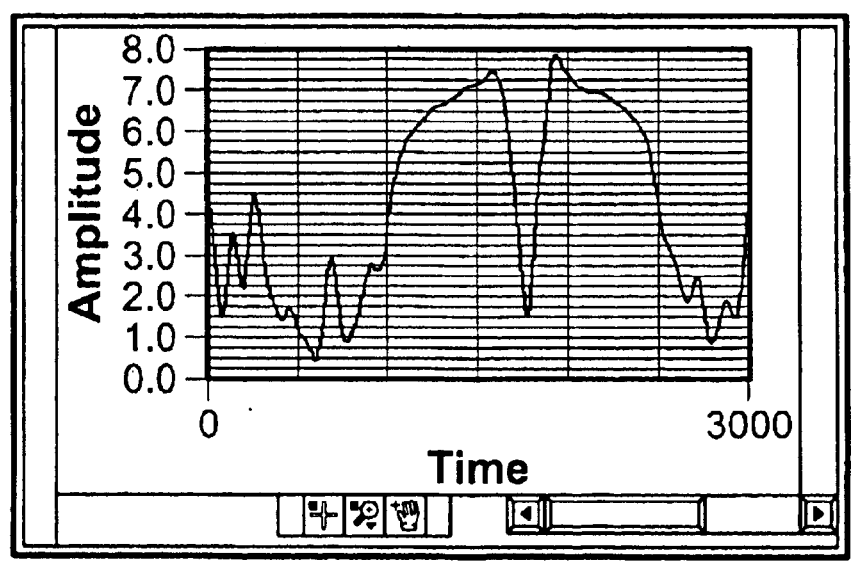
Figure 16C:
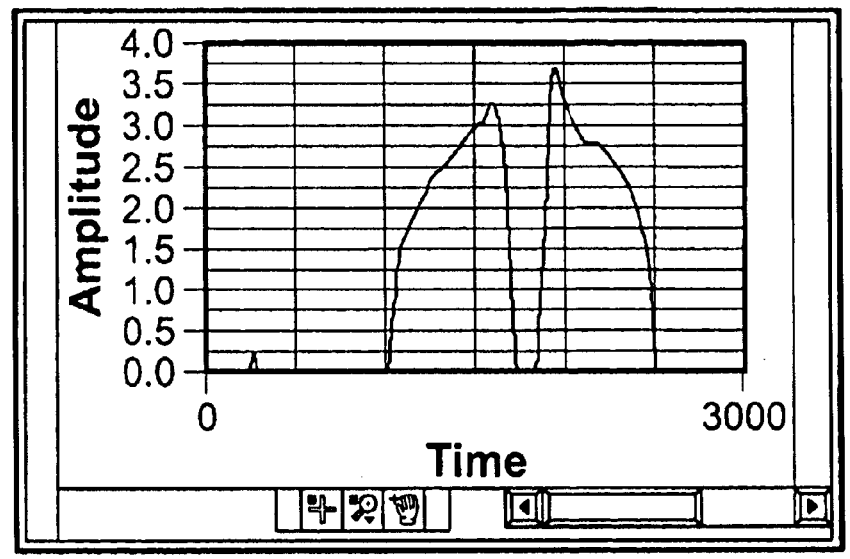

Referring to FIG. 14, the "resolve minimum" sub routine is essentially a digital pattern recognition routine for identifying a true minimum PZT value in the output response of the energy relaxation filter 172 and the output signals of the filters 171 and 173. This minimum PZT value corresponds to a phase-matched cavity length where the noise of the output signal is minimum when the mode lock is achieved. This sub routine as shown in FIG. 14 includes three basic operations. First, the filtered signal 172A is collected as a function of the sweeping PZT voltage in its operating range over a sampling period of time. FIG. 16A illustrates one example of such data from the relaxation filter 172 where the horizontal axis represents the PZT voltage over a sampling period. The amplitude of the signal represents the noise level in the laser output. Next, at each PZT voltage, the mean value of the signal values measured at different times within the sampling period is computed by the digital processor 181 to represent the signal value at the corresponding PZT voltage. FIG. 16B shows the mean value of the signal. The mean value of the signal values over the entire PZT voltage range is computed and is subtracted from the signal at each PZT voltage to achieve a new signal as shown in FIG. 16C. Third, the middle point between the centers of gravity of two areas with signal peaks is computed as the minimum PZT voltage at which the PZT should be biased at.

Figure 17A:
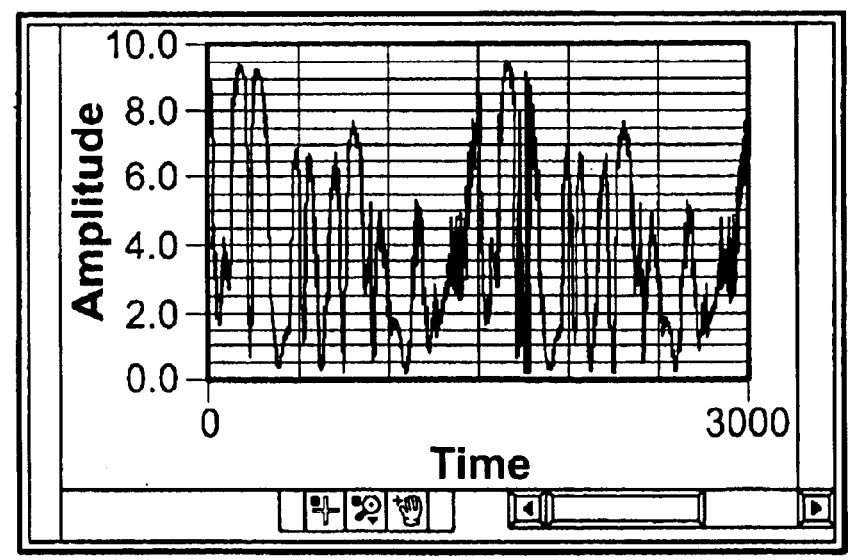
FIGS. 17A, 17B, and 17C show a measured signal from a bandpass filter of the laser in FIG. 13 where the laser does not satisfy a mode locking condition within the operating range of the PZT fiber stretcher.
Figure 17B:
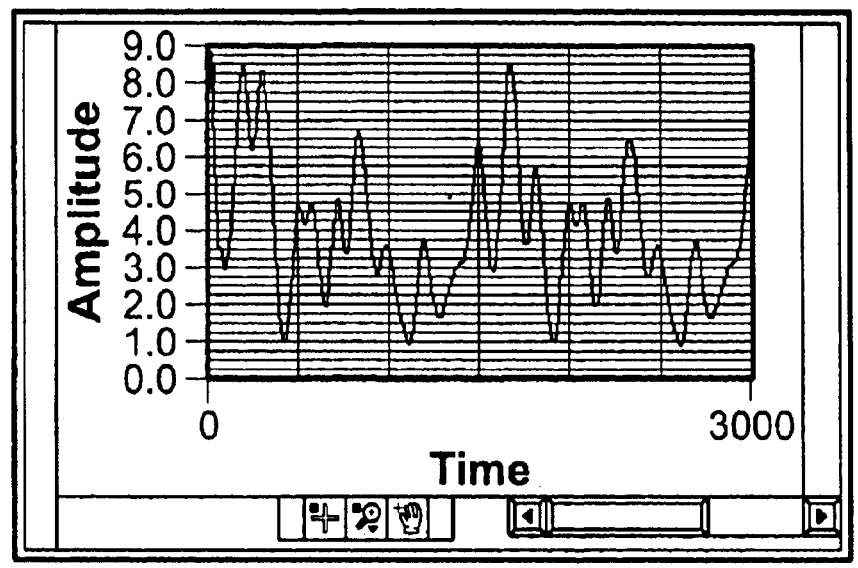
Figure 17C:
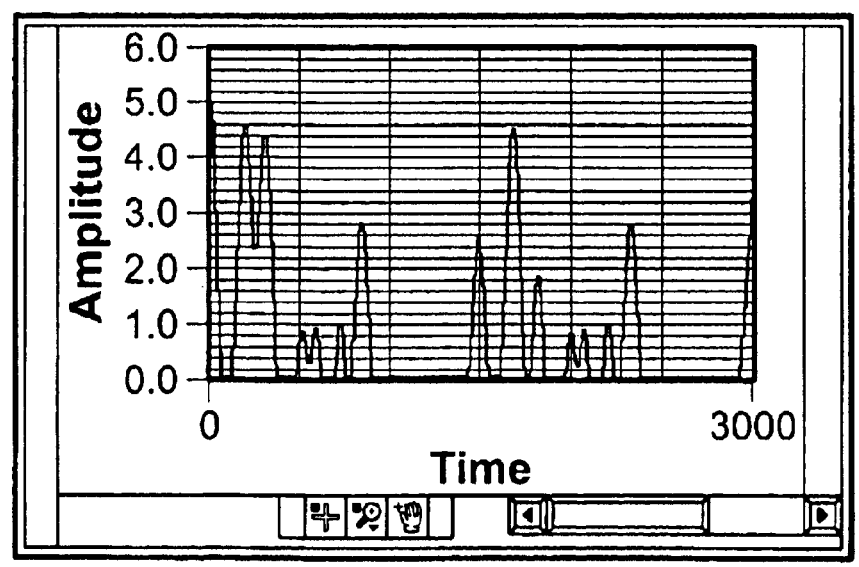

When the total laser cavity length is not properly set at a bias initial length, the laser may not meet the phase-matching condition in the entire sweeping range of the PZT voltage on the fiber stretcher. Under this condition, the output of the filter 172 is random and does not have a minimum area between two signal peaks. This condition is shown by data in FIGS. 17A, 17B, and 17C. To achieve mode locking, the initial cavity length should be adjusted by either changing the operating temperature of the chamber 150 or tuning the DC bias PZT voltage n the fiber stretcher to place the phase-matched cavity length within the operating range of the PZT fiber stretcher.

Figure 15:
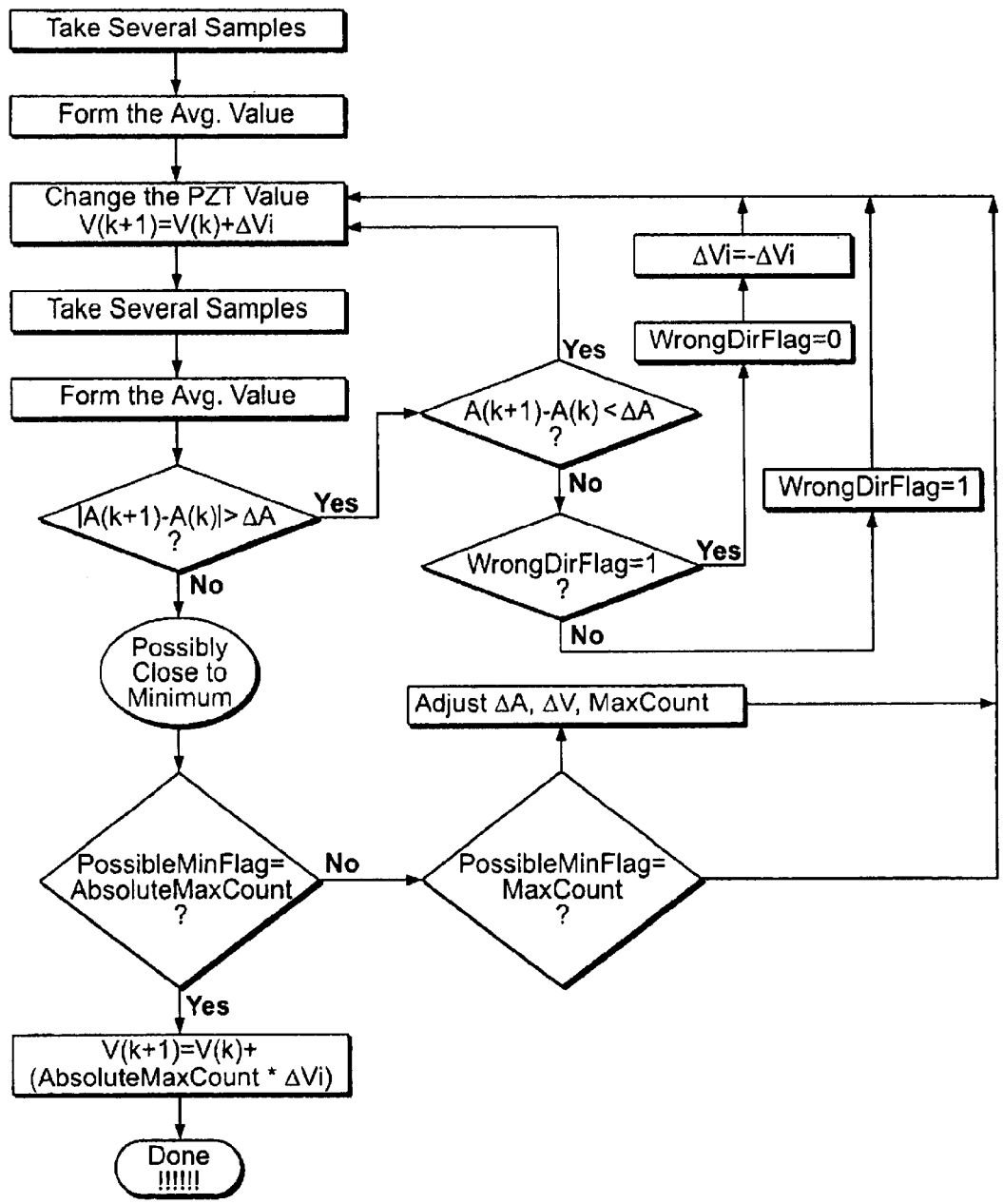

The "find minimum" sub routine in FIG. 15 searches through the vicinity of the minimum PZT voltage from the sub routine in FIG. 14 to find the real minimum PZT voltage. Basically, the digital processor 181 searches by stepping in small increment in both directions achieve this.

The above digital control system allows the feedback control to perform complex diagnostics on the performance of the laser and thus to accurately determine the optimal mode-locking condition of the laser. In particular, the digital control system may be used to set the laser from non-mode-locking condition to a mode-locking condition, automatically without human intervention. Therefore, this system may be advantageous over an analog control system to provide a more self-sustained laser mode-locking and long-term reliability. More specifically, the processing of the filtered output from one or more bandpass filters 171–173 based on digital pattern recognition in searching for the value of the phase-matched laser cavity length (PZT voltage) for establishing mode locking may be difficult to implement with analog circuitry. In addition, the processing of the filtered output from one or more bandpass filters 171–173 based on digital pattern recognition in searching for the value of the DC bias to the modulator 126 during normal mode locking operation of the laser may also be difficult to implement with analog circuitry.

In the laser 1300 in FIG. 13, the thermally-controlled chamber 150 encompasses the entire laser cavity 101 to heat the chamber above the environmental temperature. This design may be replaced by a partial active thermal control system where one or more selected thermal-sensitive portions of the laser cavity may be enclosed in the thermal control chamber while the remaining portions of the laser cavity may be left outside the chamber. The variation in these remaining portions of the laser cavity may be compensated for by the fast control mechanism.

Figure 18:
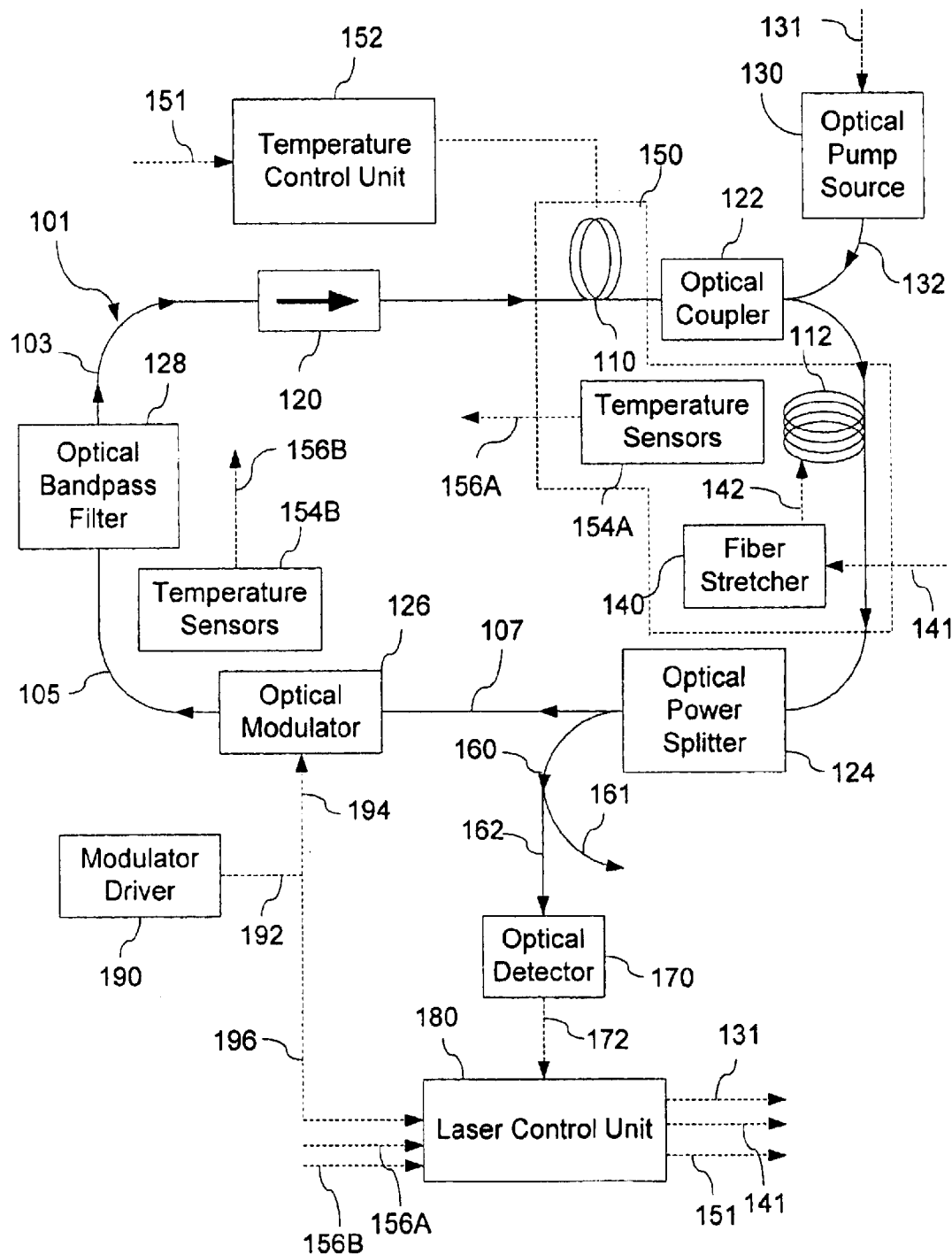
FIG. 18 shows a partial active thermal control of the laser cavity for the laser in FIG. 12.

FIG. 18 shows an alternative design of the laser 1300 using the above partial active thermal control. Notably, the fiber segments 110 and 112 may be designed to constitute the majority of the optical path length of the fiber ring 101, e.g., greater than about 80%. Hence, any variations in the physical lengths of the fiber segments 110 and 112 dominate over variations in other fiber segments (less than 3 to 10%) in the fiber ring 101. To reduce the power consumption in thermally stabilizing the fiber ring 101, the thermally controlled chamber or housing 150 may be used to enclose only the fiber segments 110 and 112 while leaving other fiber segments and optical components outside the chamber 150. Additional temperature sensors 150B may also be placed in other parts of the fiber ring 101 outside the thermally-controlled chamber 150. The sensor signals 156B indicating local temperatures at the sensor locations are also fed to the laser control unit 180.

Figure 19:
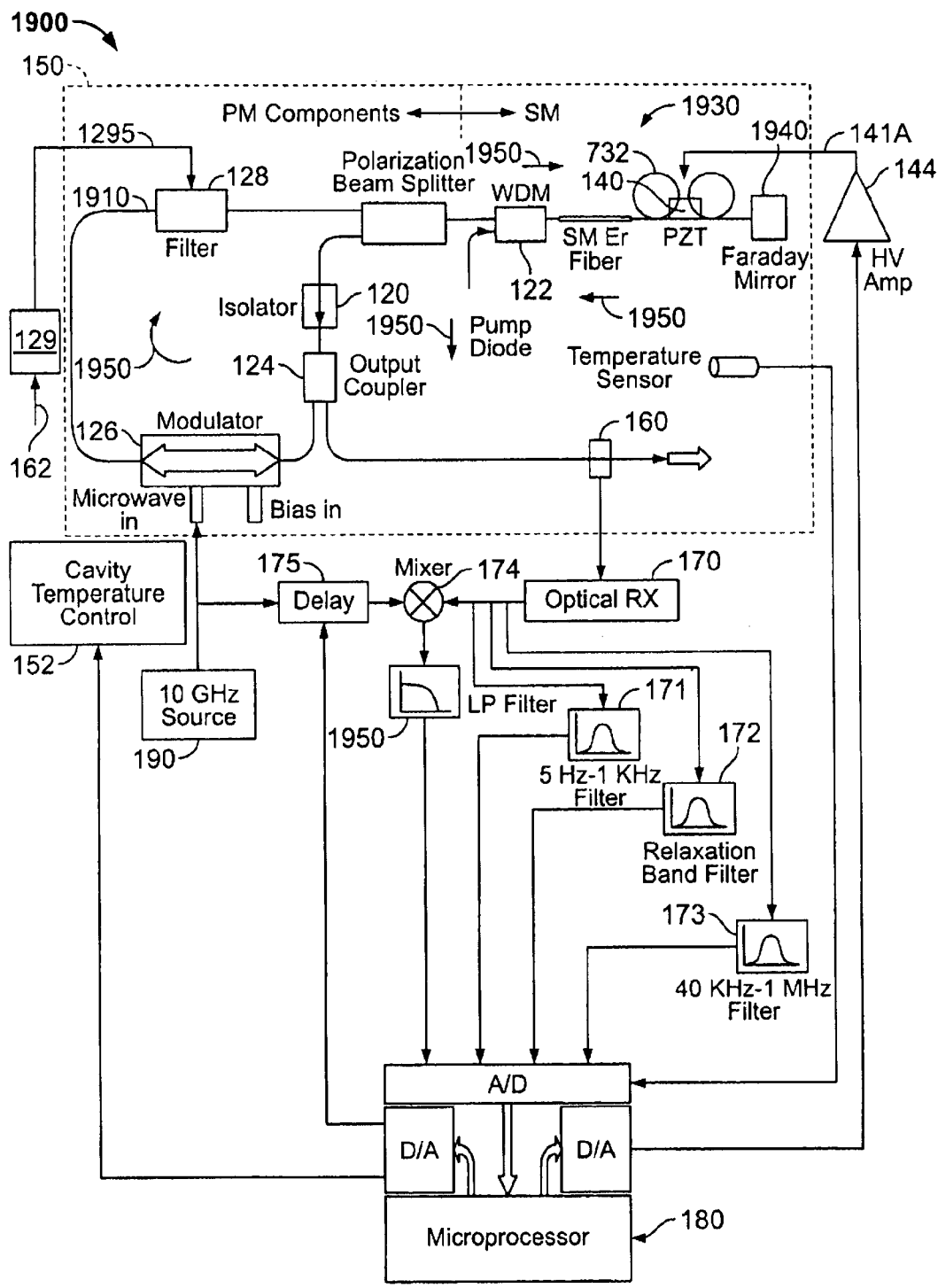
FIG. 19 shows one embodiment of an actively mode-locked fiber laser in a sigma cavity design with a dynamic cavity length feedback control and a dynamic wavelength tuning control.

As described above, the above techniques and designs are not limited to actively mode-locked ring lasers and may be used actively mode-locked lasers with different cavity configurations. As an example, FIG. 19 shows a polarization-stable Sigma fiber laser 1900 equipped with the above wavelength tuning and cavity length control mechanisms. Certain aspects of the cavity design may be found in, e.g., U.S. Pat. No. 5,574,739. The laser cavity includes a first PM fiber part 1910 formed of a single-mode PM fiber and a second single-mode fiber part 1930 formed of a single-mode fiber. The first fiber part 1110 includes the tunable optical bandpass filter 128 controlled by the tuning control unit 129, the modulator 126, the optical isolator 120, and the output coupler 124. Two terminals of the fiber part 1910 are coupled to two facets of a polarizing beam splitter 1920 which is coupled to one end of the second fiber part 1930. The other end of the fiber 1930 is terminated at a Faraday rotator mirror 1940 which reflects light with a 90-degree rotation in polarization. A portion 1932 of the second fiber part 1930 may be doped as the optical gain medium. The line 1950 represents the direction of the light in the optical cavity: light starts from the gain section 1932 to be reflected by the reflector 1940 and is amplified again before reaching the beam splitter 1920. Light in one polarization is selected to be reflected into the first fiber part 1910 by the beam splitter 1920 and is fed back to the gain section 1932 after being modulated by the modulator 26 and passing through the beam splitter 1920. Light in the other polarization is suppressed. The second fiber part 1130 may also include a dispersion compensating fiber segment 1934 similar to the segment 112 in FIG. 13. The thermal control chamber 150 may be used to enclose the entire laser cavity as in FIG. 13 or only the second fiber part 1930 to reduce the power consumption as in FIG. 18. The fiber stretcher 140 may be placed in either of the fiber parts 1910 and 1930.

Furthermore, since the active control mechanism consumes power in controlling the laser cavity, the total amount of the control over the laser cavity may be partitioned into a passively controlled part and an actively controlled part. The actively controlled part includes thermal control chamber with a powered element, such as an electrical heater or a thermoelectric cooler, and is controlled by the active control mechanism to stabilize the temperature within the thermal control chamber. The passively controlled part, in contrast, is coupled to a passive control unit that does not require a power supply and hence does not consume power. This passive control unit is specially designed to change the dimension of the passively controlled part to negate a change caused the environment temperature. In one embodiment, the passive control unit includes at least two different parts that are formed of two materials with different coefficients of thermal expansion. These different parts are engaged to one another and are coupled to the passively controlled part to reduce the optical path length of the laser cavity as the temperature rises and to increase the optical path length as the temperature decreases. In general, this passive control mechanism may be used to perform a portion of the compensation by the active thermal control in the thermally-controlled chamber as part of the slow control mechanism.

Figure 20:
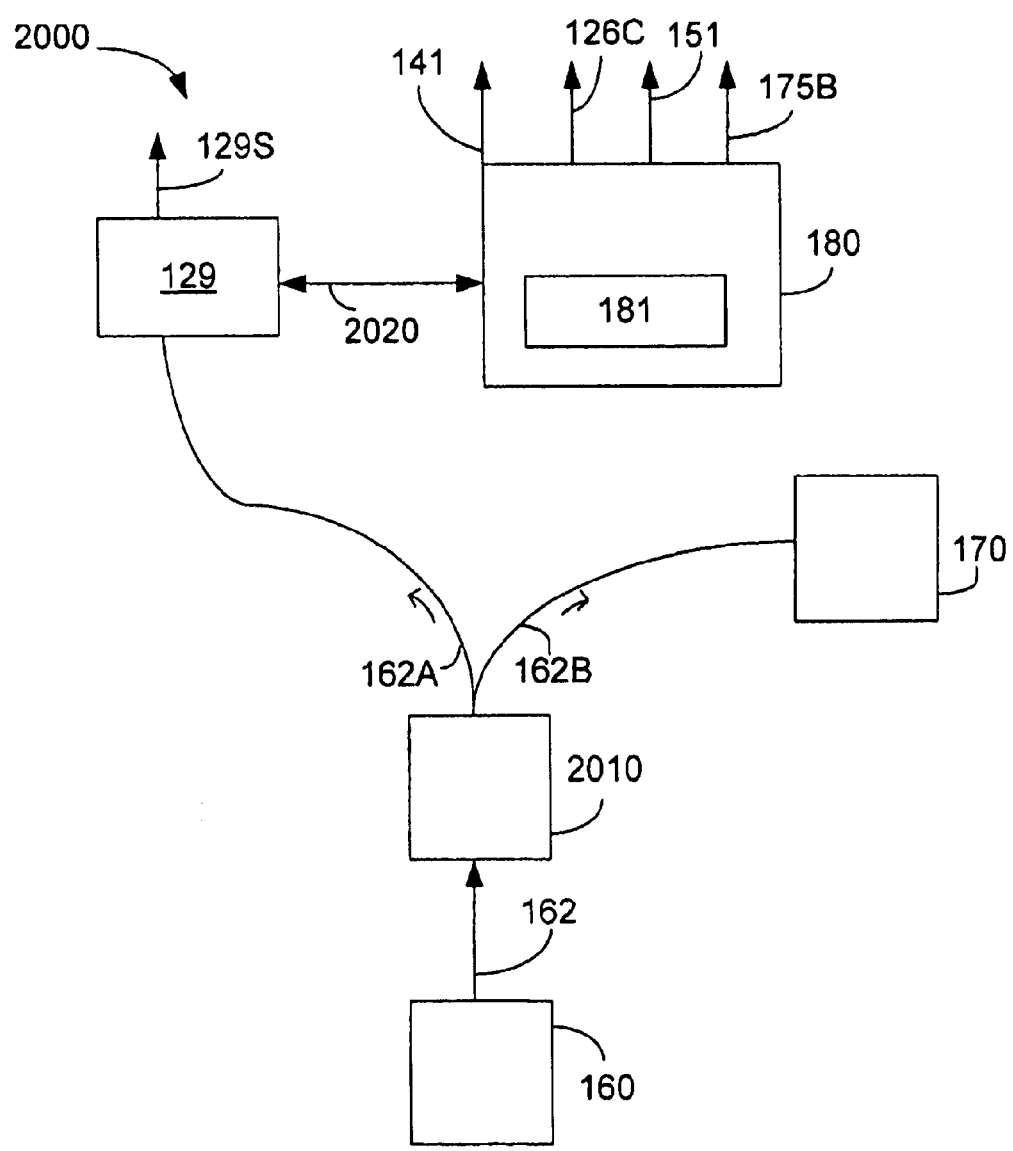
FIG. 20 shows one embodiment of the dynamic laser control system that includes (1) the wavelength tuning control shown in FIG. 1 or 2A and (2) the dynamic cavity length control shown in FIG. 13.

In one implementation, an additional optical coupler may be used to split the beam 162 into a first beam 162A for the wavelength tuning sub module 129 and a second beam 162B for the detector 170 in the cavity length control sub module. The cavity length control mechanism may operate independently of the wavelength tuning and locking mechanism, where the cavity length control mechanism may continuously operate to maintain the phase matching condition for the mode locking operation after the laser is tuned on and the mode locking is achieved. When the laser wavelength is tuned from one laser wavelength to another, the cavity length control mechanism automatically adjusts the cavity length to meet the phase matching condition during the tuning operation. Alternatively, the two sub modules may communicate with each other during operation. FIG. 20 further illustrates one embodiment of the dynamic feedback laser control 2000 for an actively mode-locked laser with a wavelength control sub module and a cavity length control sub module. An additional optical coupler 2010 may be used to split the beam 162 into a first beam 162A for the wavelength tuning sub module 129 and a second beam 162B for the detector 170 in the cavity length control sub module. A communication link 2020 allows information exchange between the two sub modules so that the tuning of the wavelength and the tuning of the cavity length can be synchronized. In one implementation, for example, the microprocessor 181 may be used to coordinate the operations of the two sub modules 129 and 180.

Hence, the above tunable actively mode-locked lasers may be used to as a signal source laser for any WDM channel. The dynamic wavelength stabilization capability permits a long-term stability for accurate operation at a selected WDM channel and the wavelength tuning capability allows for producing different WDM channels within the laser's spectral tuning range. In particular, the dispersion management within the laser cavity either through combining fibers with different dispersions, or a tunable dispersion control element, or a combination of both may used to produce a high-speed tuning of wavelength to meet various application requirements including optical communication applications.

For example, one application of the above tunable mode-locked lasers is to reduce the number of spare lasers for a Dense WDM (DWDM) network. For example, in some DWDM networks with 64 to 200 channels, the number of spare lasers is equal to the number of fixed-wavelength lasers for the channels, i.e., each signal laser has its own spare laser as a backup. Hence, each channel requires two separate lasers in such a backup design. When one of the above tunable actively mode-locked lasers is used as a spare laser, it can be used to back up any channel that is within its spectral tuning range and thus can be used as a spare laser for two or more channels. Hence, instead of having one spare laser for each channel, one tunable actively mode-locked laser may be used as the spare for multiple or all channels. This can significantly reduce the number of lasers in WDM systems and hence reduce the overall installation and maintenance costs.

Another application of the above tunable actively mode-locked lasers in a DWDM optical network is for network restoration, network provision, and wavelength switching. In a network standard SONET, any failure in a particular part of network must be restored within 50 ms. The present tunable mode-locked laser, due to its tenability in wavelength, may be used to tune to any failed DWDM channel to restore that channel. To satisfy the network restoration time requirement of 50 ms, the tuning speed of the network must be much shorter than 50 ms. Therefore, the tunable laser used for network restoration requires a fast tuning speed much faster than 50 ms. As shown in FIG. 11B, the wavelength tuning and locking module in one implementation of the design shown in FIG. 1 can tune the laser wavelength over 30 nm in less than 30 ms.

Figure 21:
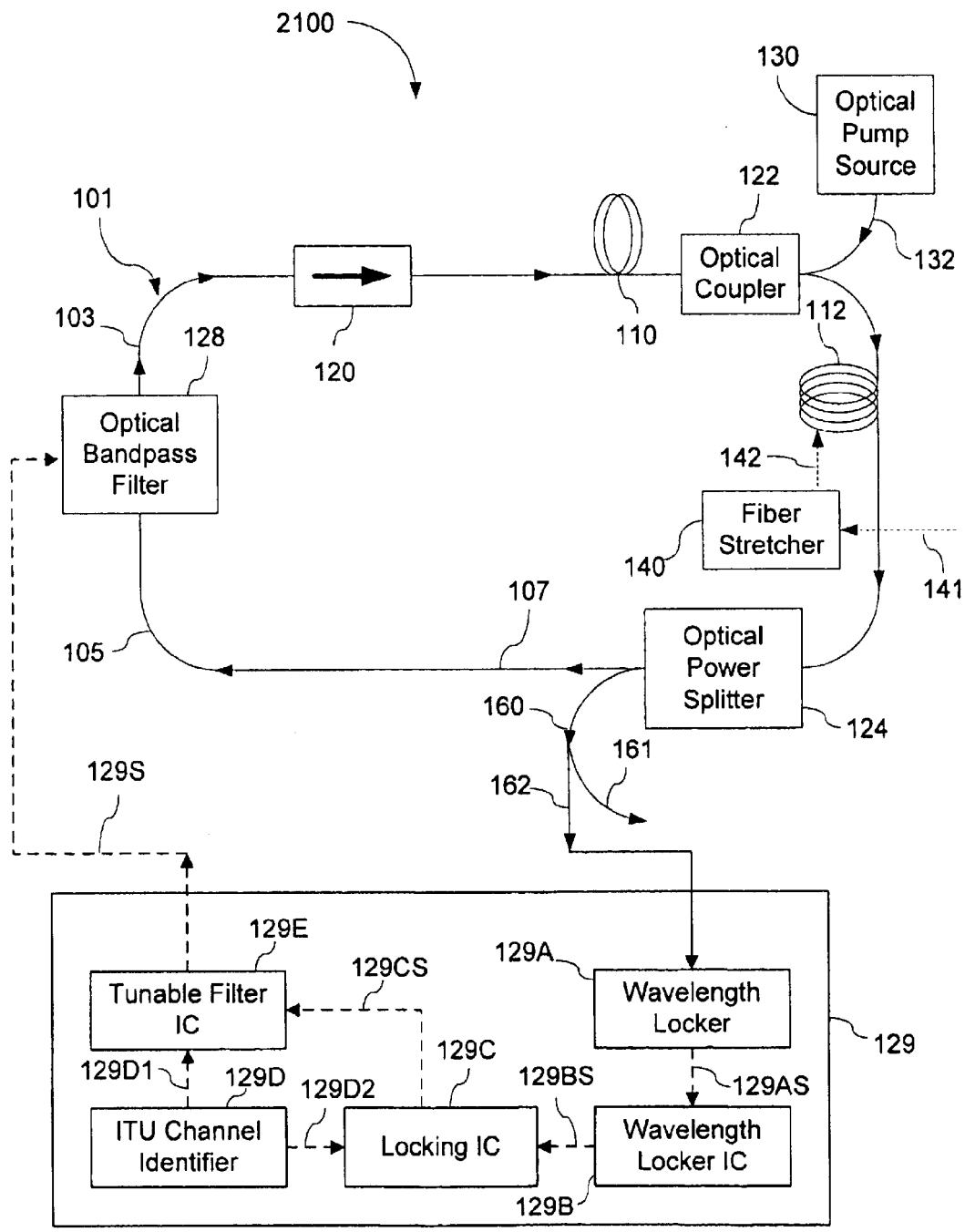
FIG. 21 shows a tunable CW fiber ring laser using the wavelength tuning and locking mechanism in FIGS. 1 and 2A.

The above wavelength tuning and locking mechanism may also be applied to a tunable CW fiber laser 2100 as shown in FIG. 21 where the optical modulator 126 is removed from the fiber laser cavity 101. The module shown in FIG. 2A may also be used. A Fabry-Perot etalon may be disposed within the laser cavity to select a single mode operation. The fiber stretcher 140 may be used to adjust the cavity length to provide a fine tuning on the wavelength within the transmission band of the filter 128. The cavity design for the CW laser may be a ring cavity as shown or other non-ring configurations. The cavity may be formed of fibers as illustrated or use other designs without the fibers.

Only a few embodiments are disclosed. However, variations and enhancements may be made without departing from the spirit of the described embodiments and are intended to be encompassed by the following claims.

What is claimed is:

1. A tunable laser, comprising:
   a laser cavity enclosing a laser gain medium which produces an optical gain for laser oscillation within a laser gain spectral range;
   an optical modulator in said laser cavity responsive to a modulation control signal to modulate at least one of an amplitude and a phase of light in said laser cavity at a modulation frequency to lock optical modes of said laser cavity to produce laser pulses;
   a tunable optical bandpass filter in said laser cavity to selectively transmit light at a transmission wavelength, said optical bandpass filter tunable to vary said transmission wavelength in response to a filter control signal; and
   a wavelength control unit producing said filter control signal to tune said filter and coupled to receive a portion of a pulsed laser output from said laser cavity as an optical monitor beam and operable to determine a deviation of a laser wavelength of said optical monitor beam from a reference wavelength, said wavelength control unit operable to adjust said filter to reduce said deviation,
   wherein said wavelength control unit comprises:
      a wavelocker to receive said optical monitor beam and to determine said deviation, said wavelocker producing an output electronic signal indicative of said deviation;
      a wavelocker circuit coupled to receive said electronic signal and to produce an error signal;
      a filter control circuit producing said filter control signal to said filter;
      a laser wavelength identifier to produce a wavelength Signal to said filter control circuit to tune said filter; and
      a locking circuit coupled between said wavelocker circuit and said filter control circuit to feed said error signal to said filter control circuit to stabilize said laser wavelength after said filter is tuned to a selected laser wavelength by said laser wavelength identifier.

2. The laser as in claim 1, wherein said laser wavelength identifier includes an optical reference bandpass filter at a known laser wavelength, said optical reference bandpass filter coupled to receive a portion of said optical monitor beam.

3. The laser as in claim 1, wherein said laser wavelength identifier includes an electronic circuit having a memory to store a lookup table with multiple tuning positions of said filter and corresponding transmission wavelengths of said filter.

4. The laser as in claim 1, wherein said wavelocker includes a Fabry-Perot reference cavity having a free spectral range equal to a wavelength difference between two adjacent transmission wavelengths of said filter.

5. The laser as in claim 1, wherein said filter includes an acousto-optic medium and an acoustic transducer engaged to said acousto-optic medium to generate an acoustic wave for spectrally filtering light.

6. The laser as in claim 1, wherein said filter includes a Fabry-Perot filter with two opposing reflectors, said filter having a tuning mechanism to change an optical path length between said two opposing reflectors.

7. The laser as in claim 6, wherein said tuning mechanism includes a piezo-electric transducer to shift one reflector relative to another reflector.

8. The laser as in claim 6, wherein said tuning mechanism includes a MEMS transducer to shift one reflector relative to another reflector.

9. The laser as in claim 6, wherein said tuning mechanism includes a liquid crystal material between said two reflectors to change a refractive index in response to a control voltage.

10. The laser as in claim 1, further comprising a cavity length control mechanism operable to control a total optical path length of said laser cavity to maintain a phase matching condition for active mode locking where an integer multiple of a mode spacing of said laser cavity equals said modulation frequency to maintain mode locking when said filter is being tuned to transmit from one laser wavelength to another laser wavelength.

11. The laser as in claim 10, said cavity length control mechanism includes:
   a cavity length control element engaged to said laser cavity to control and adjust a cavity length of said laser cavity in response to a Cavity length control signal;

a thermal control unit to control at least a temperature of a portion of said laser cavity in response to a temperature control signal;

a thermal sensor coupled to measure a temperature of said portion of said laser cavity under control of said thermal control unit to produce a temperature signal to said thermal control unit;

an optical detector receiving a portion of a laser output from said laser cavity to produce a detector output;

an electrical signal mixer to mix a reference signal split from said modulation control signal with said detector output to produce a mixer output that includes an error signal indicating a frequency difference between said modulation frequency and a multiplicity of a longitudinal mode spacing of said laser cavity;

a phase delay unit coupled to a signal path of said reference signal to cause a phase delay in said reference signal in response to a phase delay control signal;

at least one bandpass filter, having a spectral bandwidth covering at least frequencies associated with energy relaxation processes in said laser cavity, and coupled to respectively receive and filter another portion of said detector output to produce a filter output signal indicating noise in said laser output; and a digital control module to digitally process said filter output signal to extract noise information of said laser output, to digitally process said error signal to extract said frequency difference caused by said laser cavity length, to digitally process said temperature signal to determine a measured temperature of said portion of said laser cavity, wherein said digital processor is operable to produce said cavity length control signal in response to said frequency difference, said temperature control signal, and said phase delay control signal in response to said noise information of said laser output.

12. The laser as in claim 10, wherein said laser cavity includes a fiber ring where said laser gain medium includes a doped fiber segment.

13. The laser as in claim 10, wherein said laser cavity comprises:

a polarizing beam splitter (PBS);

a polarization-maintaining fiber loop having an input terminal coupled to one facet of said PBS to receive light in a selected polarization reflected from said PBS and an output terminal coupled to another facet of said PBS to output light in said selected polarization that transmits through said PBS;

an optical isolator in said fiber loop to circulate said light directing from said input terminal to said output terminal and to suppress light in directing from said output terminal to said input terminal;

a fiber segment having a first terminal and a second terminal, said first terminal coupled to said PBS to receive light from said output terminal of said fiber loop and to deliver light to said PBS a portion of which is reflected by said PBS into said input terminal of said fiber loop; and a Faraday rotator reflector coupled to said second terminal to reflect light with a rotation of polarization by about 90 degrees, wherein said fiber ring, said fiber segment, and said Faraday rotator reflector form said laser cavity.

14. A tunable laser, comprising:

a laser cavity enclosing a laser gain medium which produces an optical gain for laser oscillation within a laser gain spectral range;

a tunable optical bandpass filter in said laser cavity to selectively transmit light at a transmission wavelength, said optical bandpass filter tunable to vary said transmission wavelength in response to a filter control signal; and a wavelength control unit producing said filter control signal to tune said filter and coupled to receive a portion of a laser output from said laser cavity as an optical monitor beam and operable to determine a deviation of a laser wavelength of said optical monitor beam from a reference wavelength, said wavelength control unit operable to adjust said filter to reduce said deviation, wherein said wavelength control unit includes;

a wavelocker to receive said optical monitor beam and to determine said deviation, said wavelocker producing an output electronic signal indicative of said deviation, a wavelocker circuit coupled to receive said electronic signal and to produce an error signal, a filter control circuit producing said filter control signal to said filter, a laser wavelength identifier to produce a wavelength signal to said filter control circuit to tune said filter, and a locking circuit coupled between said wavelocker circuit and said filter control circuit to feed said error signal to said filter control circuit to stabilize said laser wavelength after said filter is tuned to a selected laser wavelength by said laser wavelength identifier.

15. The laser as in claim 14, wherein said laser wavelength identifier includes an optical reference bandpass filter at a known laser wavelength, said optical reference bandpass filter coupled to receive a portion of said optical monitor beam.

16. The laser as in claim 14, wherein said laser wavelength identifier includes an electronic circuit having a memory to store a lookup table with multiple tuning positions of said filter and corresponding transmission wavelengths of said filter.

17. A tunable laser, comprising:

a laser cavity enclosing a fiber loop to guide light and a laser gain medium which is in said fiber loop and produces an optical gain for laser oscillation within a laser gain spectral range;

an optical modulator in said laser cavity responsive to a modulation control signal to modulate at least one of an amplitude and a phase of light in said laser cavity at a modulation frequency to lock optical modes of said laser cavity to produce laser pulses;

a tunable optical bandpass filter in said laser cavity to selectively transmit light at a transmission wavelength, said optical bandpass filter tunable to vary said transmission wavelength in response to a filter control signal;

a wavelength control unit producing said filter control signal to tune said filter and coupled to receive a portion of a pulsed laser output from said laser cavity as an optical monitor beam and operable to determine a deviation of a laser wavelength of said optical monitor beam from a reference wavelength, said wavelength control unit operable to adjust said filter to reduce said deviation; and a cavity length control mechanism operable to control a total optical path length of said laser cavity to maintain a phase matching condition for active mode locking where an integer multiple of a mode spacing of said laser cavity equals said modulation frequency to maintain mode locking when said filter is being tuned to transmit from one laser wavelength to another laser wavelength, wherein said cavity length control mechanism comprises:

a cavity length control element engaged to said laser cavity to control and adjust a cavity length of said laser cavity in response to a cavity length control signal;

a thermal control unit to control at least a temperature of a portion of said laser cavity in response to a temperature control signal;

a thermal sensor coupled to measure a temperature of said portion of said laser cavity under control of said thermal control unit to produce a temperature original to said thermal control unit;

an optical detector receiving a portion of a laser output from said laser cavity to produce a detector output;

an electrical signal mixer to mix a reference signal split from said modulation control signal with said detector output to produce a mixer output that includes an error signal indicating a frequency difference between said modulation frequency and a multiplicity of a longitudinal mode spacing of said laser cavity;

a phase delay unit coupled to a signal path of said reference signal to cause a phase delay in said reference signal in response to a phase delay control signal;

at least one bandpass filter, having a spectral bandwidth covering at least frequencies associated with energy relaxation processes in said laser cavity, and coupled to respectively receive and filter another portion of said detector output to produce a filter output signal indicating noise in said laser output; and a digital control module to digitally process said filter output signal to extract noise information of said laser output, to digitally process said error signal to extract said frequency difference caused by said laser cavity length, to digitally process said temperature signal to determine a measured temperature of said portion of said laser cavity, wherein said digital processor is operable to produce said cavity length control signal in response to said frequency difference, said temperature control signal, and said phase delay control signal in response to said noise information of said laser output.

18. The laser as in claim 17, wherein said fiber loop includes a first fiber segment and a second fiber segment that exhibits a chromatic dispersion opposite to a chromatic dispersion of said first fiber segment.

19. The laser as in claim 17, wherein said laser cavity includes a dispersion control unit to produce a variable chromatic dispersion to control a chromatic dispersion in said laser cavity.

20. The laser as in claim 17, wherein said laser cavity includes a first cavity portion and a second cavity portion, and wherein said thermal control unit includes a powered thermal control element to control said first cavity portion and a passive thermal control element coupled to said second cavity portion to negate an effect of thermal expansion without receiving power from a power supply.

21. The laser as in claim 17, wherein said wavelength control unit includes:

a wavelocker to receive said optical monitor beam and to determine said deviation, said wavelocker producing an output electronic signal indicative of said deviation;

a wavelocker circuit coupled to receive said electronic signal and to produce an error signal;

a filter control circuit producing said filter control signal to said filter;

a laser wavelength identifier to produce a wavelength signal to said filter control circuit to tune said filter; and a locking circuit coupled between said wavelocker circuit and said filter control circuit to feed said error signal to said filter control circuit to stabilize said laser wavelength after said filter is tuned to a selected laser wavelength by said laser wavelength identifier.

* * * * *